US008190588B1

(12) United States Patent
Gupta et al.

(10) Patent No.: US 8,190,588 B1
(45) Date of Patent: May 29, 2012

(54) PROVIDING A DISTRIBUTED TRANSACTION INFORMATION STORAGE SERVICE

(75) Inventors: Vikas Gupta, Bangalore (IN); Allan H. Vermeulen, Seattle, WA (US); Rahul Singh, Seattle, WA (US); Duane J. Krause, Seattle, WA (US); Nipoon Malhotra, Seattle, WA (US)

(73) Assignee: Amazon Technologies, Inc., Incline Village, NV (US)

( * ) Notice: Subject to any disclaimer, the term of this patent is extended or adjusted under 35 U.S.C. 154(b) by 953 days.

(21) Appl. No.: 11/229,845

(22) Filed: Sep. 19, 2005

(51) Int. Cl.
*G06F 7/00* (2006.01)
*G06F 17/00* (2006.01)
*G06F 15/16* (2006.01)

(52) U.S. Cl. ............... 707/703; 707/615; 709/219
(58) Field of Classification Search ............... 707/104.1, 707/204, 615, 703; 709/219
See application file for complete search history.

(56) References Cited

U.S. PATENT DOCUMENTS

| 5,781,910 A * | 7/1998 | Gostanian et al. ............ 707/610 |
| 5,799,305 A * | 8/1998 | Bortvedt et al. ................ 707/10 |
| 5,905,736 A * | 5/1999 | Ronen et al. ................... 370/546 |
| 6,078,999 A * | 6/2000 | Raju et al. ...................... 711/161 |
| 7,107,340 B2 * | 9/2006 | Chkodrov et al. ............ 709/224 |
| 7,360,044 B2 * | 4/2008 | Cochran et al. ............... 711/161 |
| 2002/0010762 A1 * | 1/2002 | Kodama ....................... 709/219 |

OTHER PUBLICATIONS

Ghemawat, Sanjay, et al., "The Google File System," Google, *SOSP '03*, Oct. 19-22, 2003, Bolton Landing, New York, 15 pages.
Loney, Matt, "The Magic That Makes Google Tick," ZDNet UK, Dec. 1, 2004, retrieved May 12, 2005, from http://www.zdnet.co.uk/print/?TYPE=story&AT=39175560-39020445t-20000012c, 4 pages.

* cited by examiner

*Primary Examiner* — Apu Mofiz
*Assistant Examiner* — Chelcie Daye
(74) *Attorney, Agent, or Firm* — Seed IP Law Group PLLC

(57) ABSTRACT

Techniques are described for providing a storage service that stores information about large numbers of transactions in a persistent manner, such as with a high degree of reliability, availability and scalability based at least in part on use of a distributed computing and storage system. In some situations, the transaction information storage service stores various information about transactions that each include at least one monetary payment (e.g., a micro-payment) between financial accounts of two or more of numerous users having accounts with one or more entities. The transaction information storage service may be provided by or otherwise affiliated with a merchant, and customers of the merchant may purchase usage of the storage service for programs executed by or otherwise affiliated with the customers, with the storage service available to remote executing programs via a defined API of the storage service, such as a Web services-based API.

45 Claims, 11 Drawing Sheets

Example Data Storage System Database

| | DSS ID | Network Address | Data Center | Mirror DSS IDs |
|---|---|---|---|---|
| 204a | 150a1 | 111.111.111.001 | 160a | 150a2, 150b1, 150b2 |
| 204b | 150a2 | 111.111.111.002 | 160a | 150a1, 150b1, 150b2 |
| | | ... | | |
| 204c | 150b1 | 111.111.222.001 | 160b | 150a1, 150a2, 150b2 |
| 204d | 150b2 | 111.111.222.002 | 160b | 150a1, 150a2, 150b1 |
| 204e | 150b3 | 111.111.222.003 | 160b | 150b12, 150a15, 150a17 |
| | | ... | | |
| 204f | 150c1 | 111.222.111.001 | - | 150c7, 150b9, 150b33 |
| 204g | 150c2 | 111.333.222.001 | - | - |
| | | ... | | |

FIG. 2A

Example Transaction Partition Database

| 212a | 212b | 212b | 212c | 212d | 212e | 212f |
|---|---|---|---|---|---|---|
| Partition ID | Partition Subset ID | Partition Type | Transaction ID Start Value | Transaction ID End Value | Mirror DSS IDs | % Full |
| 170a | 170a-1 | transaction ID | 00000000000000001 | 00000000028000023 | 150a1, 150a2, 150b1, 150b2 | 100% |
| 170a | 170a-2 | transaction ID | 00000000028000024 | - | 150a15, 150a17, 150b3, 150b12 | 93% |
| 170b | 170b-1 | user1 | 00000000000001000 | - | 150a5, 150a9, 150b6, 150b7 | 05% |
| 170c | 170c-1 | user2 | 00000000000000002 | - | 150a6, 150a8, 150b14, 150b23 | 03% |
| | | | | ... | | ... |

FIG. 2B

Example Transactions

| | Transaction ID | From User | To User | Amount | From Account | To Account | Time |
|---|---|---|---|---|---|---|---|
| 224a | 00000000000000001 | user5 | user7 | $0.07 | 31431976 | 98541837 | 13:41:05.02 03/15/XX |
| 224b | 00000000000000002 | user2 | user5 | $100.00 | 43523344 | 31431976 | 13:41:05.02 03/15/XX |
| 224c | 00000000000000003 | user8134804 | user7 | $0.02 | 38471013 | 98541838 | 13:41:05.02 03/15/XX |
| 224d | 00000000000000004 | user91111111 | user9 | $0.01 | 63562653 | 34426254 | 13:41:05.02 03/15/XX |
| | ... | | | ... | | | |
| 224e | 00000000000001000 | user1 | user2 | $0.01 | 25626254 | 43523344 | 13:41:05.03 03/15/XX |

FIG. 2C

PROVIDING A DISTRIBUTED TRANSACTION INFORMATION STORAGE SERVICE

TECHNICAL FIELD

The following disclosure relates generally to using a distributed storage system to reliably store transaction-related information.

BACKGROUND

Multiple computer systems often interact in order to achieve a goal, such as when an application program on a computer system interacts with other remote systems and applications in order to obtain various types of information and functionality that are not part of the application program. By performing such interactions, an application program may be able to leverage information and functionality from vast numbers of other computer systems over the Internet or other networks.

In order to enable such interactions between remote computer systems and executing software applications, various programmatic interaction mechanisms have been developed. For example, remote procedure call ("RPC") protocols have long existed that allow a program on one computer to cause a program on another computer to be executed, and various object-oriented architectures such as CORBA ("Common Object Request Broker Architecture"), DCOM ("Distributed Component Object Model"), Java RMI ("Remote Method Invocation"), JavaSpaces, Jini, JXTA, and UPnP ("Universal Plug-n-Play") provide similar capabilities. In addition, a variety of middleware programs have been implemented to connect separate applications (often of distinct types and from unrelated sources) to allow communication. For example, various EDI ("Electronic Data Interchange") networks exist that provide standard mechanisms to allow a computer system of one user of the network to send data to a computer system of another user of the network.

The widespread popularity of the World Wide Web ("Web") has provided additional opportunities for computers to inter-communicate. For example, much current Web use involves users interactively requesting Web pages from Web servers (e.g., via executing Web browser applications of the users) and receiving the requested information in response. In addition to such interactive user specification of requested information, there is also growing use of the Web to support the programmatic interaction of remote applications to exchange information via defined APIs ("application program interfaces"), such as APIs based on Web services interaction mechanisms. Web services allow heterogeneous applications and computers to interact, and can be defined and implemented using a variety of underlying protocols and techniques. For example, some Web service implementations return data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. In other implementations, additional underlying protocols are used for various purposes, such as SOAP ("Simple Object Access Protocol") for standard message exchange, WSDL ("Web Services Description Language") for description of service invocation interfaces (e.g., using XML format), and UDDI ("Universal Description, Discovery, and Integration service") for discovery of available services.

Interactions between computer systems and software applications may be performed for a variety of reasons. For example, Web use has increasingly provided a medium for users to interactively engage in shopping-related transactions, and interactions between computer systems may further be performed as part of a variety of other types of transactions between two or more parties, such as for other commerce-related transactions that involve the exchange of funds between the parties. With respect to shopping-related transactions, the Web allows users to search for and order items (such as products, services and/or information) that are available for purchase, rent, lease, license, trade, evaluation, sampling, subscription to, etc. In many circumstances, a user can visit the Web site of a Web merchant or retailer (also referred to as a "Web store") or other online or electronic marketplace that sells one or more items, and can view information about the items, give an instruction to place an order for one or more items, and provide information needed to complete the purchase (e.g., payment and shipping information). The Web merchant then fulfills the order by providing the ordered items to the indicated recipient, such as by providing product items that have been ordered through physical distribution channels (e.g., shipment via a governmental postal service or private common carrier) or electronically (e.g., via download over the Internet, such as for digital music or videos) as appropriate. Ordered service items may similarly be provided electronically (e.g., providing email service) or physically (e.g., performing cleaning services at the purchaser's house).

Information about transactions that have occurred often needs to be stored in a reliable manner for long periods of time (e.g., indefinitely), such as by a storage system that is accessible to other systems providing transaction information to be stored and/or retrieving stored transaction information. However, such storage system typically need to provide a high degree of availability to the other systems, particularly if high volumes of requests to the storage system occur, as well as to be able to scale efficiently to accommodate an increasing amount of stored transaction-related data and/or an increasing volume of transactions. Unfortunately, existing storage systems (e.g., a monolithic relational database system) cannot typically provide such storage-related capabilities in a cost-effective manner, and are not typically able to effectively scale to meet increasing demand.

BRIEF DESCRIPTION OF THE DRAWINGS

FIGS. 1C and 2A-2C illustrate examples of using a distributed storage system to provide a reliable transaction information storage service.

DETAILED DESCRIPTION

Figure 1A:
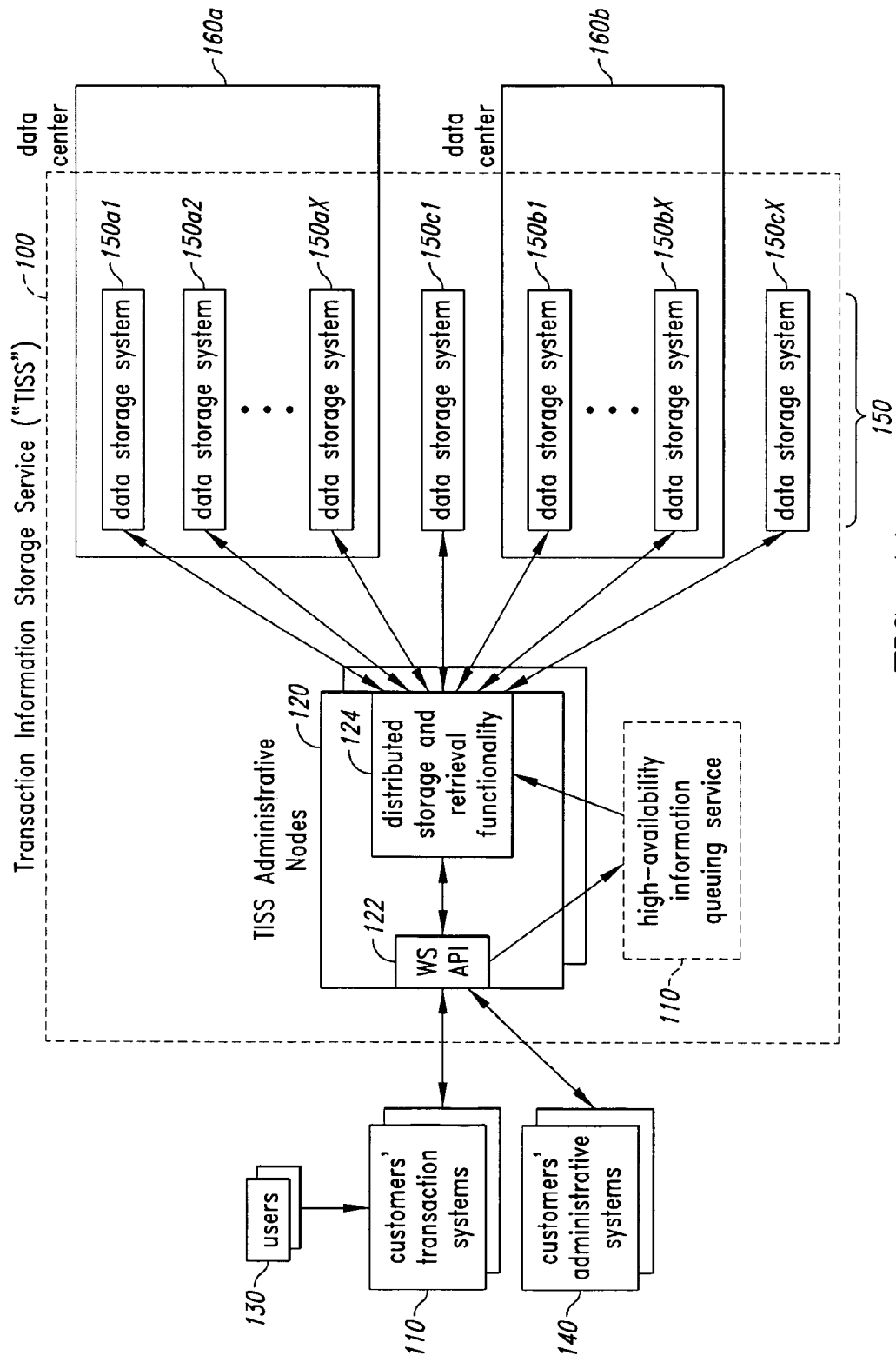
FIGS. 1A and 1B are network diagrams illustrating interactions and information flow for an example embodiment of a reliable distributed transaction information storage service.

Techniques are described for providing a storage service that is able to store information about large numbers of transactions in a persistent manner, such as with a high degree of reliability, availability and scalability based on use of a distributed computing and storage architecture. Various embodiments of the transaction information storage service are able to store a variety of types of information about a variety of types of transactions, such as in some embodiments to store information about transactions that each include at least one monetary payment (e.g., a micro-payment) between financial accounts of two or more of numerous users having accounts with one or more entities (e.g., a bank, a payment processing system, etc.).

In some embodiments, the storage service is provided by or otherwise affiliated with a merchant (e.g., a Web merchant) who sells access to or use of the storage service to customers so that programs executed by or otherwise affiliated with the customers can use the storage service to store information about transactions affiliated with those customers. In addition, in some embodiments accessibility of the storage service is provided to remote executing programs via a defined API ("application program interface") of the storage service, such as an API based on Web services functionality that is provided by the storage service to enable programs to send requests to store information about transactions and/or to retrieve stored information about transactions. For example, a customer who desires to use the storage service to store information from one or more systems or application programs may be allowed to initially create an account with the merchant and/or establish one or more subscriptions with the merchant (e.g., to define types of functionality and/or levels of service to be provided), and then obtain access to the storage service (e.g., via the API) in order to store and retrieve transaction information, as discussed in greater detail below.

In at least some embodiments, the transaction information storage service is provided using a distributed storage architecture having numerous storage and computing system nodes, such as to enhance availability, reliability and scalability of the storage service. For example, availability and reliability of the storage service is enhanced in at least some embodiments by storing information about each transaction on each of multiple distributed data storage system nodes (e.g., computing systems having associated data storage) of the distributed storage architecture—in this manner, when one of the storage systems becomes unavailable (e.g., due to hardware failure of the system and/or a network connectivity failure), information about the transaction remains available from other systems, and the unavailable system may further be replicated on a new storage system using information from one or more other such systems. In addition, in at least some embodiments the transaction information storage service has multiple logical storage partitions that are each associated with a distinct subset of the numerous data storage systems of the distributed storage architecture, with information for each new transaction to be stored in each of one or more of the logical storage partitions, which can facilitate retrieval of stored information as well as facilitate balancing of the storage and/or computing load across the numerous data storage systems. Furthermore, at least some embodiments of the transaction information storage service provide scalability in a variety of ways, such as by adding additional storage and computing nodes to the distributed architecture as needed so as to scale linearly with the volume of transactions. Additional details of the distributed storage architecture for embodiments of the transaction information storage service are discussed in greater detail below.

For illustrative purposes, some embodiments are described below in which specific types of capabilities and functionalities are provided using a distributed architecture in various specific ways, although those skilled in the art will appreciate that the techniques of the invention can be used in a wide variety of other situations, including in some embodiments to use other types of distributed architectures and/or to store other types of information that are not related to transactions, and that the invention is not limited to the exemplary details provided.

FIG. 1A illustrates an example of providing a transaction information storage service using a distributed computing and storage architecture. In particular, in the example embodiment illustrated in FIG. 1A, one or more of various customers first use administrative systems 140 to interact with a Transaction Information Storage Service ("TISS") distributed system 100 in order to establish an ability to store transaction information with the TISS system. The TISS system may, for example, be provided by an organization or other entity distinct from the customers, such as a merchant that provides the storage service to others for a fee, and if so the initial interactions by the customers may include creating fee-based subscriptions or otherwise providing payment to the merchant that will then allow the customer to access various functionality provided by the merchant. In other embodiments, the TISS system may instead operate on behalf of a single customer, such as when provided for use with a single transaction system of the customer (e.g., when provided by the customer in a manner integrated with the transaction system), and if so such initial interactions by the customer to establish the ability to store transaction information may not be used.

In response to the interactions by the customers, the TISS system in the illustrated embodiment establishes one or more transaction logs for use by each of the customers, and provides to each customer one or more unique identifiers for use in storing transaction-related information (e.g., a unique customer identifier, a unique identifier for each transaction log of the customer, etc.). In at least some embodiments, the information stored in a transaction log of a customer may be accessible only to that customer or as otherwise specified by that customer. After the ability to store transaction information with the TISS system has been established for a customer, one or more transaction systems 110 (e.g., executing application programs) of the customer may then interact with the TISS system to store transaction information in and retrieve transaction information from the customer's transaction log. In other embodiments in which the TISS systems operates on behalf of a single customer, such as if the customer uses a single transaction log, the single customer may not receive or use any such unique identifiers when storing transaction-related information.

In this example embodiment, the interactions with the TISS system by the administrative systems 140 and transaction systems 110 of the customers are performed using an API 122 of the TISS system, which in this example is an API that programmatically interacts with programs of the customers based on Web services functionality. The API 122 in this example embodiment is implemented using one or more administrative computing nodes 120, which also provide various distributed storage and retrieval functionality 124 for interacting with various data storage systems 150, as discussed in greater detail below. In addition, in the illustrated embodiment a high-availability information queuing service 110 is optionally used by the TISS system to temporarily provide real-time storage for received information and requests until they are processed by the distributed storage and retrieval functionality 124, and in some embodiments some or all of the APIs with which the transaction systems 110 and/or administrative systems 140 interact may instead be directly provided as part of the queuing service. Additional details related to one example of a high-availability queuing service that may in some embodiments be used as an optional queuing service 110 are included in U.S. application Ser. No. 10/967,109, filed Oct. 15, 2004 and entitled "Providing a Reliable Distributed Queuing Service," which is incorporated herein by reference in its entirety. The administrative systems 140 may instead interact with the TISS system in other manners in other embodiments, such as to allow users of those systems to interactively exchange information with the TISS system (e.g., using Web browsers of the administrative systems, not shown, to interact with a Web site of the TISS system, not shown), and other types of APIs may similarly be used by the transaction systems 110 to exchange transaction information with the TISS system in other embodiments (e.g., to use other types of inter-computer communication mechanisms, to allow bulk storage and/or retrieval of information, such as by using a batch processing mode, etc.).

In some embodiments, the TISS system may further provide various levels or types of services that a customer can optionally select (e.g., for a fee), such as to affect a degree of reliability and/or longevity with which transaction information will be stored, and if so a variety of types of information may be specified by a customer to affect use of the customer's transaction log(s), such as during initial establishment of the ability to store transaction information with the TISS system (e.g., to be part of the customer's subscription with the TISS system, such as to control use of transaction logs associated with the subscription). For example, information related to payments for storage and/or retrieval actions may be specified, such as to specify a payment source for services provided on a per-fee basis (e.g., fees charged on an aggregate basis for a certain number of storage and/or retrieval operations, fees charged on an aggregate basis for a certain time, fees charge on a per-storage operation and/or per-retrieval operation basis, etc.). Various configuration information related to transaction logs may also be specified in at least some embodiments, such as to specify usage restrictions for the transaction logs (e.g., a throughput ceiling and/or storage size ceiling), to specify access control restrictions for use of the transaction logs (e.g., to limit some users to only certain types of operations, such as a "retrieval" or "read" operation to obtain stored data from a transaction log, or to restrict some users from any access to a transaction log), and/or to specify other types of information (e.g., to specify a degree or level of reliability and/or availability for use of the transaction log). Various other types of customer preference and other information may similarly be specified for use by the TISS system.

As previously noted, after a customer receives a unique identifier from the TISS system in the illustrated embodiment, a transaction system 110 of the customer may then interact with the TISS system to store transaction information in and retrieve transaction information from a transaction log of the customer, such as by supplying the unique identifier with each request or otherwise identifying the customer and/or transaction log. Such transactions may reflect interactions between various users 130 and/or between the users and the transaction system 110, such as to exchange monetary payments between financial accounts of the users (e.g., accounts maintained by the customer and/or by the TISS system) or to exchange monetary payments between the users and the customer (e.g., for a customer that is a merchant, to receive payments from users based on purchases or other transactions with the merchant). In some embodiments, at least some of the transactions may occur programmatically between programs (not shown) of the users, while in other embodiments at least some of the transactions may instead occur in other manners (e.g., transactions that occur based on offline interactions between users, with information about such transactions reported to the transaction system, such as concurrent to, prior to or after the transaction occurrences).

The TISS system may further be used by customers' programs in a variety of ways. For example, in some situations a single transaction system 110 of a customer may store data and later retrieve and use that data, such as for use in balancing the amounts of the users' financial accounts in accordance with the funds transfers for the transactions. Additional details related to one example of a system that may in some embodiments be used to store and/or retrieve transaction-related information (e.g., for transactions involving micropayments or other types of financial payments) are included in U.S. patent application Ser. No. 10/894,350, filed Jul. 19, 2004 and entitled "Performing Automatically Authorized Programmatic Transactions," which is incorporated herein by reference in its entirety. Alternatively, in some embodiments other programs of a customer (e.g., an administrative system 140, or other program that is not shown) may retrieve transaction information stored by one or more other transaction systems, such as to balance amounts in users' financial accounts, to monitor performance of the transaction system(s) and/or of the TISS system, etc. Such balancing of one or more users' financial accounts may include, for example, retrieving information about all transactions for a user that meet specified criteria (e.g., all transactions during a specified period of time, such as a month), and calculating a new balance for the user's account based on the changes from a prior balance due to the retrieved transactions. Furthermore, in some embodiment embodiments such customer programs may further provide additional related functionality, such as to provide various types of notifications related to the balance summary or other information obtained from reviewing the retrieved transactions, such as to notify a user when their account balance passes below a specified threshold (e.g., zero dollars) and/or to notify a transaction processing system when a user's account balance is sufficiently low to hinder the completion of additional transactions. Furthermore, when stored transaction information is retrieved by programs other than those that store the information, various benefits may be obtained, such as accommodating different programs' abilities to provide and consume data (e.g., the ability to process data at different rates), allowing multiple distinct transaction systems affiliated with a customer to provide transaction information to a single transaction log, and allowing multiple programs (e.g., programs unrelated to the transaction system(s) and/or to each other) to retrieve data from a single transaction log. In addition, the transaction systems that produce or otherwise obtain information to be stored do not need to execute simultaneously with those programs that use (or "consume") the information, since the storage service in this example embodiment will reliably store data (e.g., in accordance with the level and type of storage services subscribed to for the transaction log, such as to maintain information for multiple years), and the producing and consuming programs further may be heterogeneous with respect to programming language, operating systems, computing hardware, etc. as long as they are both able to access one or more APIs provided by the TISS system.

Figure 1B:
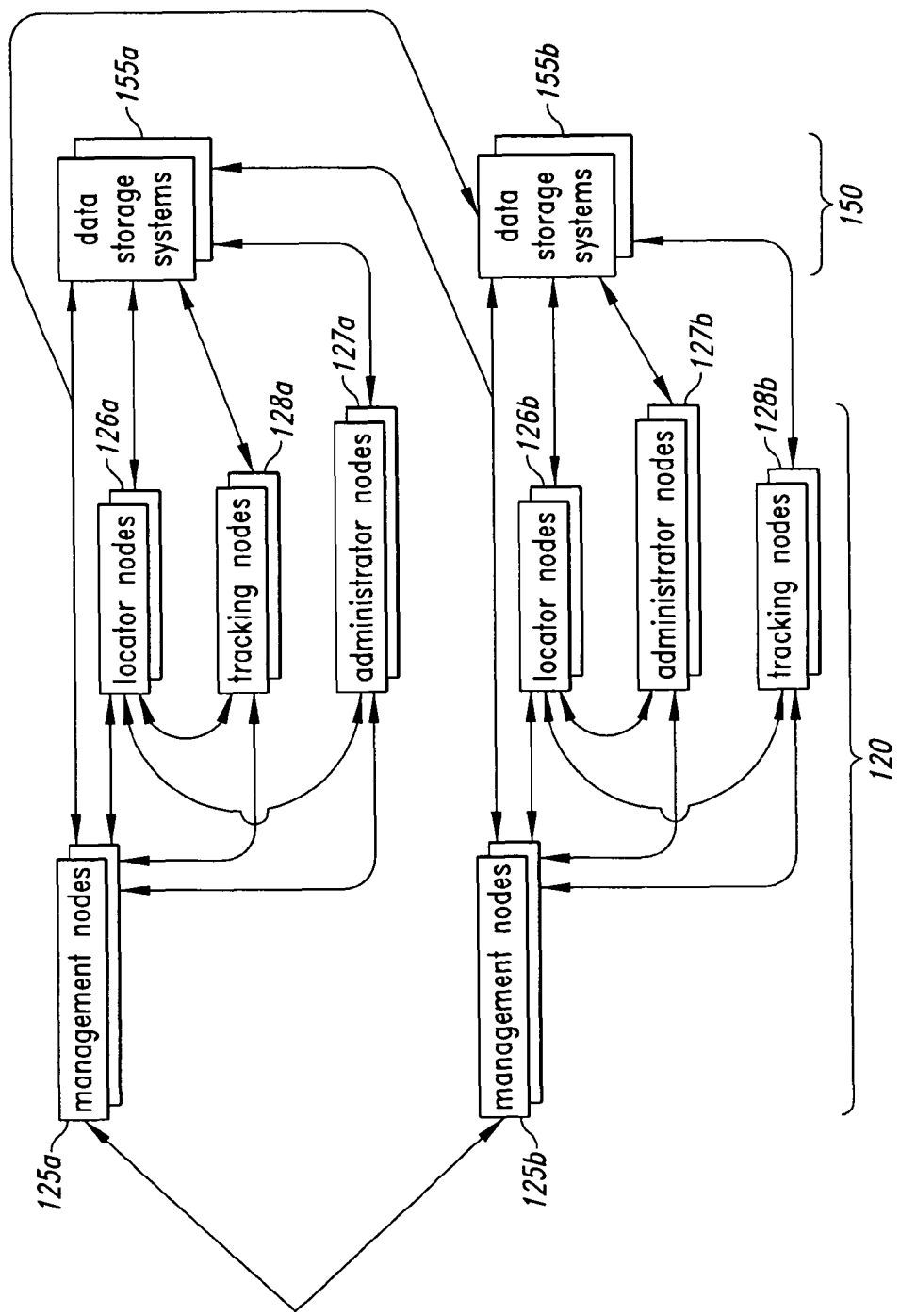

When the API 122 of the TISS system receives usage operation requests, such as to store or retrieve transaction information, the API forwards the requests to one or more modules or components (not shown) that in the illustrated embodiment provide distributed storage and retrieval functionality 124 based on interactions with multiple distributed data storage systems 150, as described in greater detail with respect to FIG. 1B. In some embodiments, usage operation requests may further include requests to modify or remove stored transaction information, such as to reflect a transaction that has been canceled or changed, while in other embodiments stored transaction information may not be modified or removed (e.g., with the modification, canceling or reversal of a transaction being implemented by a new transaction with additional funds transfers to reflect the modification or reversal).

In this example embodiment, high availability and high reliability for the TISS system is provided by the distributed data storage systems 150, as well as by multiple distributed administrative computing system nodes 120, with the data storage systems able to take various forms in various embodiments (e.g., computing systems with attached or otherwise associated storage, database servers for databases, stand-alone network storage devices, etc.). For example, as discussed in greater detail with respect to FIGS. 1C and 2A-2C, information about each transaction is stored on each of multiple distributed mirror data storage systems, and similar transactions may be grouped together in various ways in logical storage partitions that are each stored across multiple alternative data storage systems that each include a subset of the transaction information for that storage partition. Moreover, as discussed in greater detail with respect to FIG. 1B, multiple distributed administrative computing system nodes 120 may be used to provide high availability and high reliability for the TISS system by providing multiple alternative instantiations for each of a variety of types of administrative functionality. In addition, additional data storage systems 150 and administrative computing system nodes 120 may be seamlessly added to provide scalability for the TISS system in at least some embodiments.

In this example embodiment, at least some of the distributed data storage systems 150 are clustered together, such as by using multiple geographically distributed data centers 160 that each include multiple data storage systems, In addition, in this example other stand-alone data storage systems (e.g., 150c1-150cX) are also available for use, although in other embodiments such stand-alone data storage systems may not be used. When selecting a group of data storage systems to mirror each other, the data storage systems are chosen in this illustrated embodiment in such a manner as to maximize the likelihood that the failure of one of the data storage systems does not result in the failure of the other data storage systems, but also in such a manner as to minimize communications between geographically distributed locations. For example, to select mirror data storage systems for system 150a1 in data center 160a, at least one mirror data storage system will typically be selected within data center 160a (e.g., data storage system 150a2), and at least two mirror data storage systems will typically be selected at a location outside of data center 160a (e.g., 2 data storage systems in data center 160b)—thus, failure of a particular data storage system (such as system 150a1) will not prevent stored transaction information from being retrieved from another data storage system at that location (such as system 150a2), and a failure of power and/or connectivity to one location (such as data center 160a) will not result in a loss of access to the stored transaction information from another location (such as data center 160b). In the illustrated embodiment each data storage system belongs to a single group of mirror data storage systems that each store a copy of the same set of information (e.g., with each of the data storage systems in the group having similar or the same storage capacity), although in others embodiments a data storage system may instead belong to multiple groups of mirror data storage systems storing distinct sets of information, and if so assignments of such mirror systems may further be performed so as to prevent overloading of the mirror systems.

FIG. 1B provides additional details related to using multiple administrative computing system nodes 120 to provide distributed storage and retrieval functionality 124 in the illustrated embodiment. In particular, in the illustrated embodiment various types of functionality of the TISS system are separated among multiple types of modules, and multiple alternative instantiations of each type of module are provided on distinct computing system nodes 120 of the distributed computing architecture. As is illustrated, the types of functionality in this example are provided by multiple management nodes 125, multiple locator nodes 126, multiple administrator nodes 127, and multiple tracking nodes 128. As discussed in greater detail below, the management nodes manage responding to received usage requests to store or retrieve transaction-related information, the locator nodes assist in identifying appropriate data storage system nodes for particular requests, the administrator nodes assist in replicating failed data storage system nodes and in adding additional data storage system nodes (e.g., to add one or more new storage system nodes to a logical storage partition when the existing storage system nodes for that partition are completely or substantially full), and the tracking nodes track performance of various aspects of the TISS system (e.g., to identify when to add additional administrative nodes and/or data storage system nodes).

In particular, in this example usage requests received from customers (e.g., from transaction systems 110 via API 122 as shown in FIG. 1A) are each forwarded to one of the management nodes 125a or one of the management nodes 125b. Each of the management nodes includes management module software (not shown) to handle responding to the received requests, such as to manage storing transaction information that is received and to manage retrieving requested transaction information. In some embodiments, various other types of usage requests may be received and handled by the management modules as well, such as to create a new transaction log, create or update a customer account and/or associated subscription(s), etc. Also, while not illustrated here, the management nodes 125 may each provide at least portions of the API 122, such as to receive requests directly from customers' transaction systems. In addition, in at least some embodiments various techniques may be used to distribute received requests among the various copies of the management nodes, such as by using one or more load balancers (not shown), using round robin DNS ("Domain Name System") functionality, etc.

When a management module receives a request to store or retrieve transaction information, the management module first interacts with a locator module (not shown) on a locator node in order to identify the appropriate one or more data storage system nodes to use in satisfying the request. In the illustrated embodiment, the management node will communicate with local nodes when possible, with administrative nodes 125a-128a and the group of data storage system nodes 155a each being co-located at a first location (e.g., data center 160a), and with administrative nodes 125b-128b and the group of data storage system nodes 155b each being co-located at a second location (e.g., data center 160b). Thus, a management node 125a will communicate with one of the local locator nodes 126a, and a management node 125b will communicate with one of the local locator nodes 126b. When retrieving information stored on a group of multiple mirror data storage system nodes, a management node will similarly communicate with one of the local data storage system nodes if they are in the group and available—thus, a management node 125a will communicate with one of the local data storage system nodes 155a if possible, and a management node 125b will communicate with one of the local data storage system nodes 155b if possible.

Figure 1C:
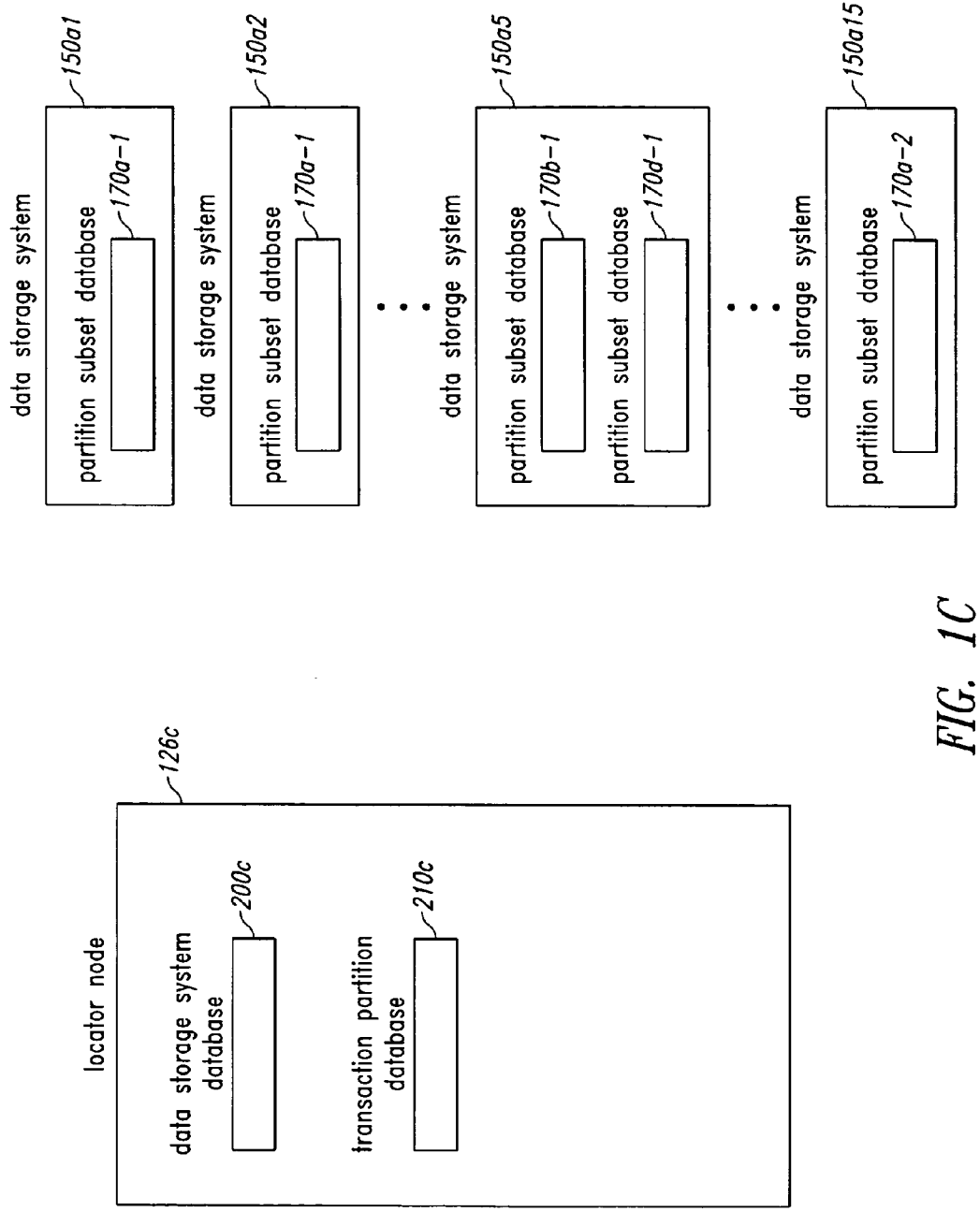

In order to identify appropriate data storage system nodes to use in satisfying requests, the locator nodes each maintain various information about the data storage system nodes. In particular, as shown in FIG. 1C with respect to example locator node 126c, in the illustrated embodiment each locator node includes a copy of a data storage system database and a transaction partition database, with copies 200c and 210c respectively of the databases shown for locator node 126c. FIGS. 2A and 2B further illustrate portions of example data storage system and transaction partition databases that correspond to FIG. 1C, and FIG. 2C illustrates examples of transactions between users that may be stored on various data storage system nodes in various logical storage partitions. In these illustrated examples, information is shown for only a single customer and single transaction log, and the number of logical storage partitions, transactions, users, and data storage systems (and the corresponding number of database entries) have been minimized for purposes of clarity, but those of skill in the art will appreciate that other embodiments may provide for much larger numbers of customers, transaction logs, logical storage partitions, transactions, users, and data storage systems (e.g., tens of thousands of transactions per second involving tens of millions of users, with one or more kilobytes of information for each transaction being stored using thousands of data storage systems that each may have gigabytes of storage and the ability to store multiple thousands of transactions per second).

In particular, the example data storage system database table 200 of FIG. 2A includes various entries 204a-204g that each correspond to a data storage system, such as one of the data storage systems illustrated in FIGS. 1A and 1C, with this example database including information indicating a unique identifier of the data storage system (e.g., a unique name), a network address of the data storage system (e.g., an IP address), an indication of a data center (if any) in which the data storage system is located, and indications of mirror systems for the data storage system. While not illustrated here, in some embodiments various information is also obtained and stored for some or all of the data storage systems, such as an amount of associated storage, an indication of how much (if any) of the associated storage space is currently available, and various types of status information, such as an indication of the last time that a communication was received from a system (e.g., to track whether a system continues to be available for new operations).

By maintaining such information about data storage systems used by the TISS system, new data storage system nodes can easily be added for use with the TISS system, and existing data storage systems can easily be removed when they fail or otherwise become unavailable. To incorporate such changes, available data storage systems to use for a usage operation may in at least some embodiments be dynamically selected at the time of at least some such operations. In addition, by enabling the easy addition of new data storage systems, the TISS system can easily scale to handle increasing workloads and/or to handle increasing numbers of transactions that are stored. Moreover, the ability to easily remove and replace failed systems also allows low-cost commodity and/or failure-prone systems (e.g., systems providing less than "four nines" (99.99%) or "five nines" (99.999%) guaranteed uptime) to be used for data storage systems in at least some embodiments. In particular, when an existing data storage system fails in the illustrated embodiment (e.g., due to a hard disk crash or failure of other hardware that prevents a system from rebooting, software bugs that cause a system to hang or reboot, failure of a network connection to the data storage system, permanent destruction of a data center, etc.), another new data storage system may be used to replace the failed system for new operations, as well as to in at least some embodiments replicate the information stored on the failed system on the new replacement data storage system (e.g., based on information from one or more mirror systems for the failed system). Furthermore, in some embodiments the TISS system (or the merchant or other entity providing the service) may guarantee levels of service or reliability to customers based on an estimated probability of failures of data storage systems, such as the likely costs associated with maintaining multiple copies of transaction information and replicating failed systems.

While not illustrated here, similar information may be maintained for some or all of types of administrative nodes 120, whether in database table 200 or instead in one or more additional tables, and may be stored by tracking nodes or locator nodes or instead in other manners (e.g., with each type of node storing information about nodes of its type, or with tracking nodes storing information about administrative nodes). Also, in a similar manner to that discussed for data storage system nodes, new management, locator, administrator and tracking nodes can easily be added for use with the TISS system, including to easily scale to handle increasing workloads, and existing nodes can easily be removed when they fail or otherwise become unavailable, thus allowing low-cost commodity and/or failure-prone systems to be used for such administrative nodes. To incorporate such changes in available nodes, some or all of the types of administrative nodes to use may in at least some embodiments be dynamically selected at the time of use. Additional details regarding adding new administrative nodes and replacing failed administrative nodes are included below.

FIG. 2B illustrates an example transaction partition database table 210 that includes various entries 214a-214d each corresponding to at least a portion of a logical storage partition, such as for logical storage partitions illustrated in FIG. 1C. In particular, in at least some embodiments the transaction information for each logical storage partition will initially begin to be stored in a first group of mirror data storage system nodes. When a certain predefined threshold is reached for the available storage on those mirror nodes (e.g., when the storage becomes full or substantially full), additional transaction information will begin to be stored on a new group of mirror data storage system nodes. This process can continue indefinitely as long as additional data storage system nodes are available, with each group of mirror data storage system nodes containing a subset of the transaction information for the logical storage partition. Thus, in this example, the table 210 includes information indicating identifiers for each logical storage partition and its one or more partition subsets, as well as the group of mirror data storage systems for each partition subset—in some embodiments, a mirror storage node for a partition subset may further be identified with a database name and table name corresponding to the database and table on that node that store the transaction information for the partition subset, although those details are not illustrated here. In the illustrated example, the table 210 further includes information for each partition subset indicating a group of transactions whose information is stored on the partition subset and indications of a degree of fullness of the partition subset, with each transaction being given a unique increasing numeric transaction identifier, and with the group of transactions for a partition subset are indicated by starting and ending transaction identifier values for the transactions in the group. In other embodiments, the group of transactions for a partition subset may be identified in other manners (e.g., based on a range of times that are associated with the group of transaction), as may each transaction (e.g., by using transaction identifiers that each include a timestamp).

In addition, in some embodiments various additional types of information may be obtained and stored in table 210 related to partitions, such as a customer, transaction log and/or subscription associated with each logical storage partition. Various configuration information related to logical storage partitions and their subsets may also be stored, such as information related to the degree to which a logical storage partition will be distributed over mirror data storage systems (e.g., the number of data storage systems in each mirror group), whether and how each mirror data storage system for the logical storage system will be replicated upon becoming unavailable, an amount of storage of each mirror data storage system node associated with a partition subset to be used for that partition subset (e.g., 100%), etc. In particular, in some embodiments various of such configuration information may be configurable for some or all logical storage partitions (e.g., by a customer with whose transaction log the logical storage partitions are associated, by the merchant, etc.), such as to accommodate different levels or types of capabilities purchased or otherwise requested by a customer, or instead to accommodate varying numbers of currently available data storage systems (based on existing data storage systems becoming unavailable and/or new data storage systems becoming available), while in other embodiments some or all such information may be fixed for all logical storage partitions.

Thus, upon a request to retrieve transaction information for an indicated transaction from a logical storage partition, such as based on the transaction identifier for the transaction, a locator module can use the information in the database 210 to quickly identify which subset (if any) of the logical storage partition contains information for that transaction (e.g., in milliseconds), identify the group of mirror data storage systems that store the transaction information for that partition subset, and then provide information about one or more of the mirror data storage systems to a management node for use in retrieving the transaction information. As described in greater detail below, appropriate logical storage partitions and their subsets may also be identified for transactions in other manners, such as based on associated transaction times, users involved in the transactions, amounts of the transactions, etc. In addition, a locator module can similarly use the information in the database 210 to quickly identify which subset of a logical storage partition is a current subset in which new transaction information is to be stored (e.g., in milliseconds), and to identify the mirror data storage systems for that subset that are each to receive a copy of the transaction information.

As previously noted, in at least some embodiments multiple logical storage partitions are used to store transaction information, which may assist in distributing the computing load across various of the data storage system nodes. In some embodiments, each logical storage partition subset on a data storage system node is a single database table, such as a table that uses most or all of the storage space associated with that data storage system node. In addition, the logical storage partitions may be selected in such a manner as to store information about groups of similar or otherwise related transactions, such as to facilitate later retrieval about multiple such related transactions by having the information stored on one or a small number of data storage systems (e.g., in one or a small number of subsets for a logical storage partition). In particular, in the illustrated embodiment information about each transaction is stored in multiple logical storage partitions, with each user who is engaged in transactions having a distinct logical storage partition that stores information about transactions in which that user is involved, and with at least one logical storage partition storing information about transactions based on other information specific to the transactions, such as the transaction identifiers. In other embodiments, however, each user may not have a distinct logical storage partition, but instead information about the financial accounts involved in a transaction (e.g., account identifiers) and/or users involved in a transaction (e.g., user identifiers) may be used as an indexing value in a logical storage partition subset table that stores information regarding multiple financial accounts and users, or such account or user information may otherwise be used to reference information about corresponding transactions. In this manner, information regarding a specific financial account and/or user can still be quickly retrieved from such a table (e.g., in milliseconds), but only a single logical storage partition is needed to store the information regarding the various financial accounts and users. As yet another alternative, in some embodiments subsets of financial accounts and/or users may each be associated with one of multiple logical storage partitions, such as by performing a hash function based on the financial account identifiers and/or user identifiers. In addition, as an alternative to having a single logical storage partition that stores information about all transactions based on information specific to the transactions (e.g., the transaction identifiers), in some embodiments subsets of transactions may each be associated with one of multiple such logical storage partitions, such as based on one of multiple transactions types and/or on other information with which transactions may be segmented. Furthermore, in some embodiments at least some of the information being stored may be encrypted, and if so groups of similar encrypted information (e.g., encrypted using the same encryption key or technique) may each be stored in a distinct logical storage partition.

Similarly, in some embodiments a single logical storage partition may store information about all transactions, such as by indexing the table based on one or more types of information related to transactions (e.g., transaction identifier), while in other embodiments subsets of transactions may each be associated with one of multiple transaction-based logical storage partitions, such as by performing a hash function based on the transaction identifiers and/or other transaction information. In addition, in some embodiments different types of information may be stored in the account-focused or user-focused logical storage partition(s) and in the transaction-focused logical storage partition(s), such as to store all transaction-related information in the transaction-focused logical storage partition(s) (e.g., all accounts and amounts involved) but to store only account-related information (e.g., an amount credited or debited to an account, such as without an indication of a source or destination for the amount) in each entry in the account-focused or user-focused logical storage partition(s). Similarly, in some embodiments in which multiple customers and/or multiple transaction logs are available, each customer and transaction log may have one or more distinct logical storage partitions, such that information from distinct transaction logs and/or customers is not physically stored in the same table or on the same data storage system node, while in other embodiments some or all such information may instead be stored together, such as by using customer identifiers and/or transaction log identifiers as indexing values for logical storage partition tables, as well as by providing appropriate security at a table entry level so as to restrict access to a customer's data as specified. In the illustrated embodiment, column 212*b* of the transaction partition database table 210 further includes an indication of the type of each of the logical storage partitions, with partition 170*a* storing transactions based on transaction identifier, partition 170*b* storing transactions in which user1 is involved, and partition 170*c* storing transactions in which user2 is involved.

FIG. 2C illustrates information 220 about various example transactions, including example transactions 224*a*-224*e*. The illustrated types of information include, for each transaction, indications of a transaction identifier, two users involved in the transaction, a financial amount to be transferred between indicated financial accounts of the two users, and an associated time for the transaction. The illustrated information may reflect the type of information stored in each logical storage partition for the transactions associated with that logical storage partition. Thus, in this example embodiment, transaction 224*b* involves a payment from user2 to user5, and information for the transaction would be stored in logical storage partition 170*c* for user2, a logical storage partition for user5, and logical storage partition 170*a* for all transactions. As this is the first transaction involving user2 in this example, the start value 212*c* for user2's logical storage partition 170*c* in table 210 indicates the transaction identifier for the transaction. When transaction 224*e* involving user1 and user2 later occurs, information for the transaction will also be stored in user2's logical storage partition 170*c*, as well as in user1's logical storage partition 170*b* and in logical storage partition 170*a* for all transactions.

As previously noted, information about transactions may be retrieved by indicating transaction identifiers associated with the transactions. In at least some embodiments, such a transaction identifier may be provided to a customer by the TISS system after the successful storage of information for the transaction, such as in response to the storage request. The storage of information for a transaction by the TISS system will in at least some embodiments be considered successful only if the TISS system can verify that a copy of the transaction information is successfully stored on each of the multiple mirror data storage systems for each of the logical storage partition subset(s) in which the information is being stored—if not, the customer may need to resubmit the storage request. In other embodiments, transaction identifiers may be generated in other manners, such as by customers or based on a request made to the TISS system prior to a storage request, or instead may not be used.

In addition, in at least some embodiments one or more transactions of interest may be identified in various ways other than based on transaction identifier(s), such as based on any of the types of transaction information that are stored. For example, a customer may request information about all transactions involving a specified user over a specified period of time, or all transactions in which that user made payments of one or more specified financial amounts (e.g., a specific amount, a range, any amount, etc.) to one or more other users. In the illustrated embodiment, the requested information may be retrieved, for example, by using information stored by a locator node to select the logical storage partition for the specified user, identify the one or more subsets of the logical storage partition that may store information about relevant partitions (e.g., based on a specified period of time or other specified range of transactions), and identify at least one of the mirror data storage systems for each of those partition subsets. The information stored on those identified mirror data storage systems can then be searched to identify matching transactions and retrieve their stored information, such as by using one or more appropriate indexing values and using any specified security or access restrictions. In other embodiments, transactions of interest may be identified in other manners, such as solely based on information from the locator nodes if they store additional types of information that allow such identification.

Thus, as previously described, the locator nodes store information about data storage system nodes of the TISS system for use in identifying appropriate data storage system nodes corresponding to transactions. FIG. 1B also illustrates administrator nodes that assist in adding new nodes and replicating failed nodes, and tracking nodes that track performance of various aspects of the TISS system. For example, if a management node requests information from a locator node for an unknown logical storage partition, an administrator node is notified to create the new storage partition. The administrator node then determines a group of mirror data storage system nodes for a first subset for the partition, initiates the partition subset on those mirror nodes (e.g., creates a database table to store entries for the transactions to be stored in the partition subset), and in some embodiments provides information about the new partition subset to one or more of the locator nodes and/or the management node that requested the partition information. To avoid two or more simultaneous requests to create a new partition from commencing at multiple administrator nodes, in at least some embodiments an administrator node, when notified to create the new storage partition, first communicates with other administrator nodes to coordinate creation of the new storage partition so as to prevent more than one new storage partition from being created (e.g., by using a leader election protocol such that an administrator node does not create a new storage partition until it receives "election" by more than half of the administrator nodes).

Similarly, when a data storage system node becomes unavailable (e.g., as detected when a management node or locator node is unable to communicate with the data storage system node), an administrator node is notified. The administrator node then replicates the failed storage node, such as on another data storage system node at the same location as the failed node. The replication is preferably performed using information from another mirror storage node at the same location as the failed node, but may use remote mirror storage nodes in some situations (e.g., if no local mirror storage nodes are available). In addition, in at least some embodiments an administrator node may first communicate with other administrator nodes to coordinate replication of the failed storage node before performing the replication in a manner to that previously discussed, so as to avoid two or more simultaneous replication attempts.

The tracking nodes may monitor the computing and storage loads on at least some data storage system nodes (e.g., local nodes) and/or monitor the computing loads on at least some other administrator nodes (e.g., local nodes), and may then store and use that information in various ways. For example, the load information may be used to provide reports and other information, as well as to generate alerts if predefined thresholds are exceeded. As one example, if a tracking node determines that the computing load on locator nodes has become too high, whether due to an increasing volume of transactions or to failures of one or more locators nodes previously in use, the tracking node will cause another locator node to be created. In some embodiments, the tracking node may create the new locator node itself, and in other embodiments it may cause the creation in other ways, such as by notifying an administrator node. The tracking or other node to create the new locator node may first communicate with other tracking nodes to coordinate the creation before it is performed in a manner to that previously discussed, so as to avoid two or more simultaneous attempts. A new locator node may obtain copies of the various information that it stores from one or more other locator nodes (e.g., a local node), or may instead collect the information from the data storage system nodes (e.g., the local nodes), such as by reading information from them.

Additional management, administrator and tracking nodes may similarly be created by or at the initiation of a tracking node, such as due to monitored loads that exceed predefined thresholds. Since in at least some embodiments management and administrator nodes do not store their own state information about data storage system nodes (e.g., when they instead merely use the information stored by locator nodes) and tracking nodes gather their own state information by performing monitoring, the creation of new such nodes may not include copying state information from existing nodes (although the creation of any of the types of nodes may include storing appropriate modules or other software on the nodes for that type of node if the software is not already present).

Figure 3:
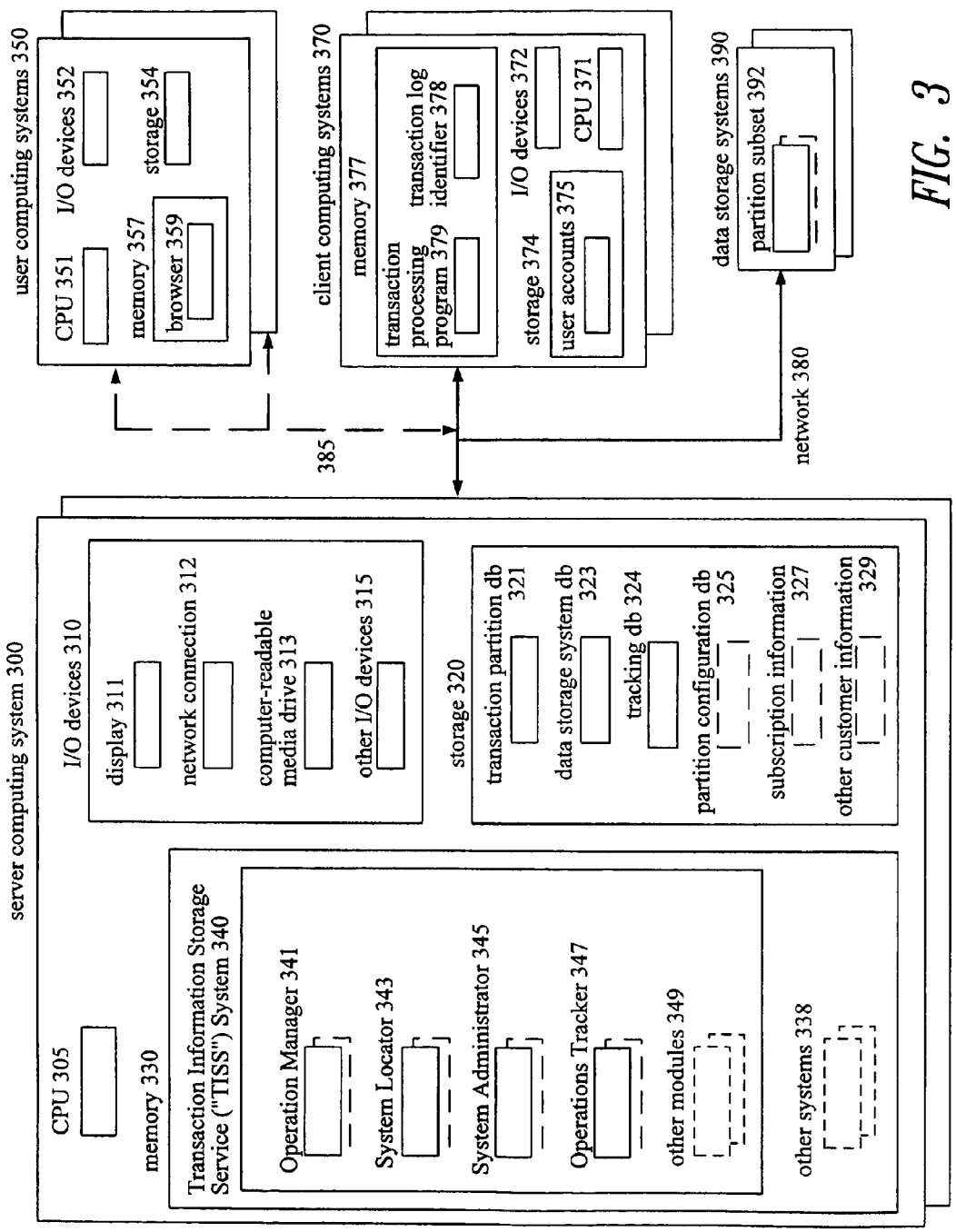
FIG. 3 is a block diagram illustrating a computing system suitable for executing an embodiment of a system for providing a reliable distributed transaction information storage service.

FIG. 3 illustrates a server computing system 300 suitable for executing an embodiment of a Transaction Information Storage Service ("TISS") system, with the computing system 300 optionally including multiple distinct distributed computing devices (e.g., multiple devices each acting as an administrative node for the TISS system). The computing system 300 includes a CPU 305, various input/output ("I/O") devices 310, storage 320, and memory 330, with the I/O devices including a display 311, a network connection 312, a computer-readable media drive 313, and other I/O devices 315. FIG. 3 also illustrates other computing and data storage systems that may interact with computing system 300 over a network 380, including one or more client computing systems 370 on which executing programs of customers may programmatically interact with the TISS system to access storage-related functionality, computing systems 350 with which users may perform transaction-related operations (e.g., interactions with each other and/or with customer computing systems 370), and data storage systems 390 that store transaction-related information in a distributed manner.

In the illustrated embodiment, an example TISS system 340 is executing in memory 330 in order to provide storage-related services for transaction information to customers, such as to a transaction processing program 379 executing in memory 377 of a client computing system 370 of each of one or more customers. The TiSS system includes one or more Operation Manager modules 341, one or more System Locator modules 343, one or more System Administrator modules 345, one or more Operations Tracker modules 347, and one or more optional other modules 349.

In the illustrated embodiment, various users conduct various transactions that involve payments between financial accounts of the users (e.g., transactions with each other and/or with a customer's computing system 370), with the accounts in this illustrated embodiment being user accounts 375 maintained by a client computing system on storage 374. A transaction processing program 379 on the client computing system receives 385 information about each of the transactions, whether transmitted to the client computing system by a user computing system (e.g., over a computer network, such as network 380) or instead based on the transaction involving the transaction processing program. The transaction processing program then interacts with the TISS system to store the transaction information, and may later retrieve and use the transaction information in various ways.

In order to use the TISS system, each customer initially interacts with the TISS system in the illustrated embodiment in order to create at least one transaction log for use in storing transaction information for that customer, and receives from the TISS system in response an identifier 378 for the transaction log that is stored for use in interactions with the TISS system. When requests to store or retrieve information are sent to the TISS system in the illustrated embodiment, the transaction log identifier is also sent with each request. The requests may be sent by, for example, invoking an API (not shown) provided by the TISS system, such as an API based on Web services, and in some embodiments each request may further include an indication of an associated subscription and/or of a customer on whose behalf the request is made (e.g., to allow the TISS system to determine whether the request is allowed based on usage restrictions and/or access controls). In some embodiments, each customer may also optionally provide various subscription, configuration and preference information for use by the TISS system, which is stored in an optional partition configuration database ("db") 325, optional subscription information 327 and optional other customer information 329 on storage 320.

When the TISS system receives a request to store provided information for one or more transactions, the system forwards the request and associated data to the Operation Manager module 341 for processing—in some embodiments, the functionality of the Operation Manager module may be distributed across multiple copies on multiple management nodes, and if so the request and data may be forwarded to any of the modules for handling in the illustrated embodiment. After a module 341 receives the request, it identifies one or more logical storage partitions in which to store the information, and interacts with the System Locator module 343 to identify a group of multiple mirror data storage systems 390 for each of the storage partitions that are available for storing the information. The Operation Manager module then attempts to store a copy of the transaction information on each of the mirror data storage systems, and after receiving an indication of success for each system, provides a corresponding response to the transaction processing program that sent the request. The Operation Manager module may also in some embodiments provide a unique transaction identifier for each stored transaction to the transaction processing program, such as for use in later retrieval of the stored information.

In a similar manner, when a transaction processing program or other program desires to obtain stored information for one or more transactions, the program sends a request to the TISS system, such as by providing one or more transaction identifiers and/or information about the types of transactions that are of interest. When the TISS system receives a retrieval (or "read") request, it forwards the request to an Operation Module, which identifies one or more logical storage partitions in which such information would be expected to be stored (e.g., based on the type of request), and interacts with the System Locator module 343 to identify at least one of the group of multiple mirror data storage systems that store the information. The module 341 then attempts to obtain the stored information from one of the mirror data storage system (s), and attempts to use other of the mirror data storage systems if the first is unavailable. After succeeding in retrieving the information, the module 341 provides a corresponding response with the retrieved information to the program that sent the request.

As noted, the System Locator module 343 maintains and provides information about storage nodes associated with logical storage partitions—in some embodiments, the functionality of the System Locator module may be distributed across multiple copies on multiple locator nodes. In particular, each such locator node may maintain a copy of a transaction partition database 321 and data storage system database 323, as shown in memory 320. Each storage node may store information for one or more partition subsets 392, such as with the transaction information for each partition subset in a database table, and the transaction partition database tracks the multiple mirror storage nodes that each store a copy of each partition subset, as well as a current subset for each partition in which to store new transaction information. The System Locator modules may obtain information about data storage systems in various ways, such as by occasionally polling (e.g., at set intervals or based on another type of indicated schedule) some or all of the data storage systems (e.g., local systems) for information, by exchanging information with other System Locator modules (e.g., at set intervals or on another type of indicated schedule, when the information is needed or otherwise used, etc.), and/or if each of the data storage systems occasionally (e.g., every few seconds) sends status messages to the TISS to indicate that they are still functioning and accessible—in some embodiments, the status messages may simply be a "heartbeat" message indicating that the data storage system is alive with little or no additional substantive data about the system, while in other embodiments additional information may be provided (e.g., an amount of available storage space that remains).

When an unavailable storage node needs to be replicated, a storage node needs to be prepared to store information for a new partition subset, or a new administrative node is needed, the System Administrator module 345 is notified (e.g., by a System Locator module or Operations Tracker module)—in some embodiments, the functionality of the System Administrator module may be distributed across multiple copies on multiple administrator nodes, and if so the request may be forwarded to any of the modules for handling in the illustrated embodiment. The System Administrator module will then perform the request as appropriate. In order to identify when additional administrative nodes are needed, the Operations Tracker module 347 gathers information about the load on the various modules of the system in various ways (e.g., by polling nodes, monitoring communications, etc.)—in some embodiments, the functionality of the Operations Tracker module may be distributed across multiple copies on multiple tracking nodes, and if so the request may be forwarded to any of the modules for handling in the illustrated embodiment.

In addition, various optional other modules 349 and/or optional other systems 338 may be present, such as modules to handle payments (e.g., if the TISS system is provided on a for-fee basis, such as by a merchant), to handle subscriptions (if the TISS system allows customers to subscribe to the service, such as to provide varying levels or types of services), a high-availability queuing service to temporarily store requests from customers until they can be processed by an appropriate module, etc.

Those skilled in the art will appreciate that computing and data storage systems 300, 350, 370 and 390 are merely illustrative and are not intended to limit the scope of the present invention. Computing system 300 may be connected to other devices that are not illustrated, including through one or more networks such as via the World Wide Web ("Web") or otherwise via the Internet. More generally, a "client" or "server" computing system or data storage system may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate intercommunication capabilities. In addition, the functionality provided by the illustrated system modules may in some embodiments be combined in fewer modules or distributed in additional modules. Similarly, in some embodiments the functionality of some of the illustrated modules may not be provided and/or other additional functionality may be available.

Those skilled in the art will also appreciate that, while various elements are illustrated as being stored in memory or on storage while being used, these elements or portions of them can be transferred between memory and other storage devices for purposes of memory management and data integrity. Alternatively, in other embodiments some or all of the software modules may execute in memory on another device and communicate with the illustrated computing system/device via inter-computer communication. Some or all of the system modules or data structures may also be stored (e.g., as software instructions or structured data) on a computer-readable medium, such as a hard disk, a memory, a computer network or other transmission medium, or a portable media article (e.g., a DVD or flash memory device) to be read by an appropriate drive or via an appropriate connection. Some or all of the system modules and data structures can also be transmitted via generated data signals (e.g., by being encoded in a carrier wave or otherwise included as part of an analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
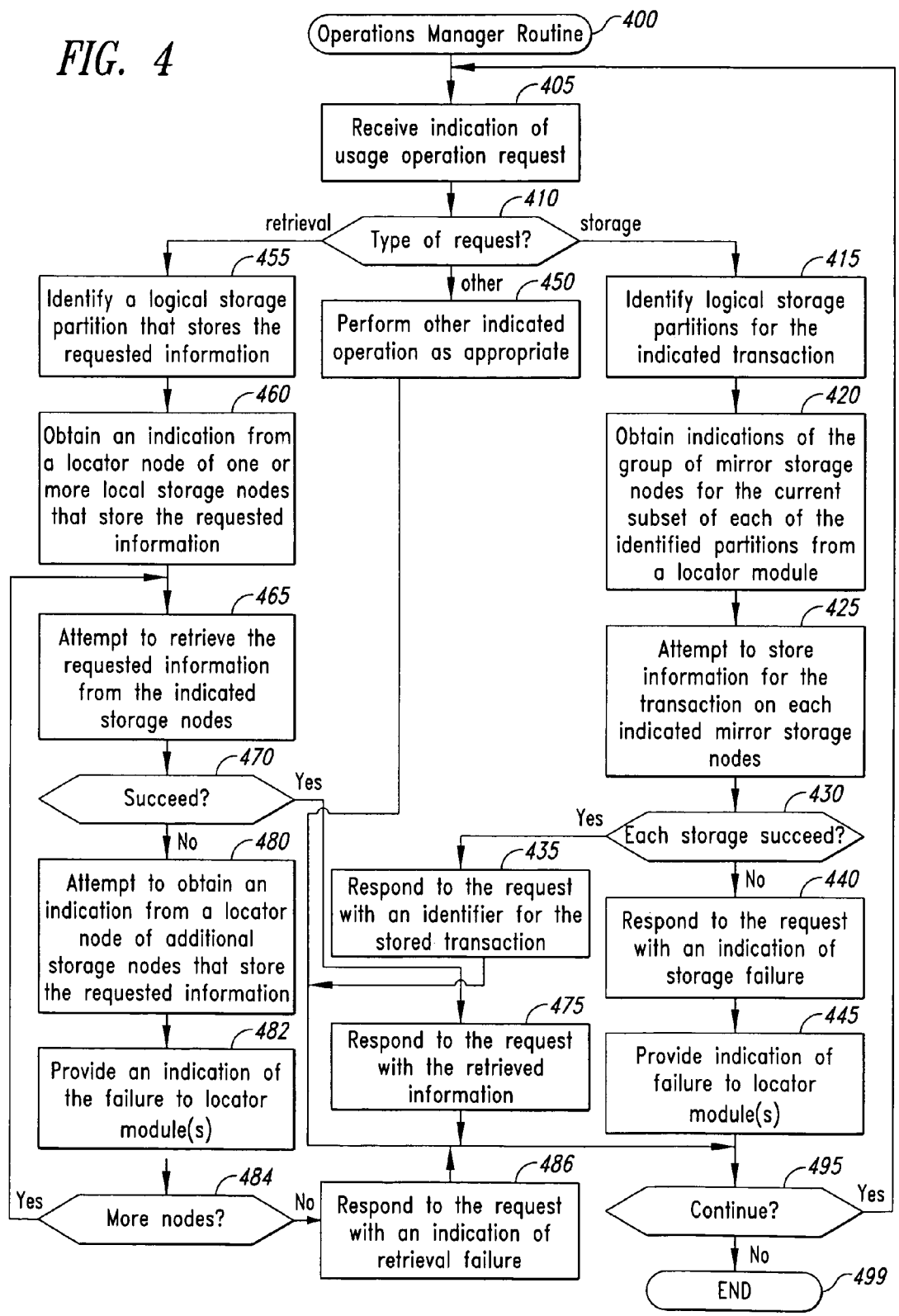
FIG. 4 is a flow diagram of an embodiment of an Operations Manager routine.

FIG. 4 is a flow diagram of an embodiment of an Operations Manager routine 400. Such a routine may be executed, for example, by an Operation Manager module 341 in the illustrated embodiment of FIG. 3 and/or by one of the management nodes 125 of FIG. 1B, such that multiple copies of the routine may execute simultaneously in parallel (e.g., one on each management node). The routine receives requests and information related to the transactions, and stores and retrieves information in an appropriate manner.

The routine begins at step 405, where an indication is received of a usage operation request, such as from a transaction processing program, and in step 410 the routine determines the type of the request. If the request is to store provided information for one or more transactions, the routine continues to step 415 to identify one or more logical storage partitions in which to store the information for each transaction, such as one partition in which distinct information for the transaction (e.g., a transaction identifier) is used as an indexing value, and another partition in which information about one or more users and/or one or more financial accounts is used as an indexing value(s). In step 420, the routine then interacts with a locator module to obtain indications of multiple mirror storage nodes for the current subset of each of the identified partitions for each transaction, and in step 425 attempts to store the transaction information for each transaction in each of the indicated mirror storage nodes for the current subset of each of the identified partitions. If it is determined in step 430 that all of the storages succeeded, the routine continues to step 435 to respond to the program that provided the transaction information with an indication of success, such as that includes a unique transaction identifier for each of the transactions. If all of the storages are not verified as having succeeded, the routine continues instead to steps 440 and 445 to provide an indication of the failure to one or more locator modules (e.g., for possible replacement with other mirror storage nodes if one or more of the previously indicated storage nodes has become unavailable) and to respond to the program that provided the transaction information with an indication of failure, so that the program can re-submit the transaction information for storage.

If it is instead determined in step 410 that the type of request is to retrieve stored information for one or more transactions, the routine continues to step 455 to identify a logical storage partition that stores the requested information, such as based on the type of information requested (e.g., if one or more transaction identifiers are provided, to select a partition in which transaction identifiers are used as an indexing value, and if information related to a user or financial account is provided, to select a partition in which user identifiers and/or account identifiers are used as an indexing value). In step 460, the routine then interacts with a locator module to obtain indications of a mirror storage node for each appropriate subset of the identified partition, and in step 465 attempts to retrieve the stored transaction information from those indicated mirror storage nodes. If it is determined in step 470 that all of the retrievals succeeded, the routine continues to step 475 to respond to the program that requested the transaction information with the retrieved information.

However, if the information retrieval did not succeed, the routine continues instead to step 480 to attempt to obtain an indicator of another mirror storage node for each appropriate subset of the identified partition, and returns to step 465 if it is determined in step 484 that other mirror storage nodes were available. In step 482, the routine also provides an indication of the failure to one or more locator modules (e.g., for possible replacement with other mirror storage nodes if one or more of the previously indicated storage nodes has become unavailable). If it is instead determined in step 484 that no other mirror storage nodes were available, the routine continues to step 486 to respond to the program that requested the transaction information with an indication of failure.

If it was instead determined in step 410 that another type of request was received (e.g., to create a new transaction log, to provide customer preference information, etc.), the routine continues to step 450 to perform the other indicated operation as appropriate. After steps 435, 445, 450, 475 or 486, the routine continues to step 495 to determine whether to continue. If so, the routine returns to step 405, and if not continues to step 499 and ends.

Figure 5:
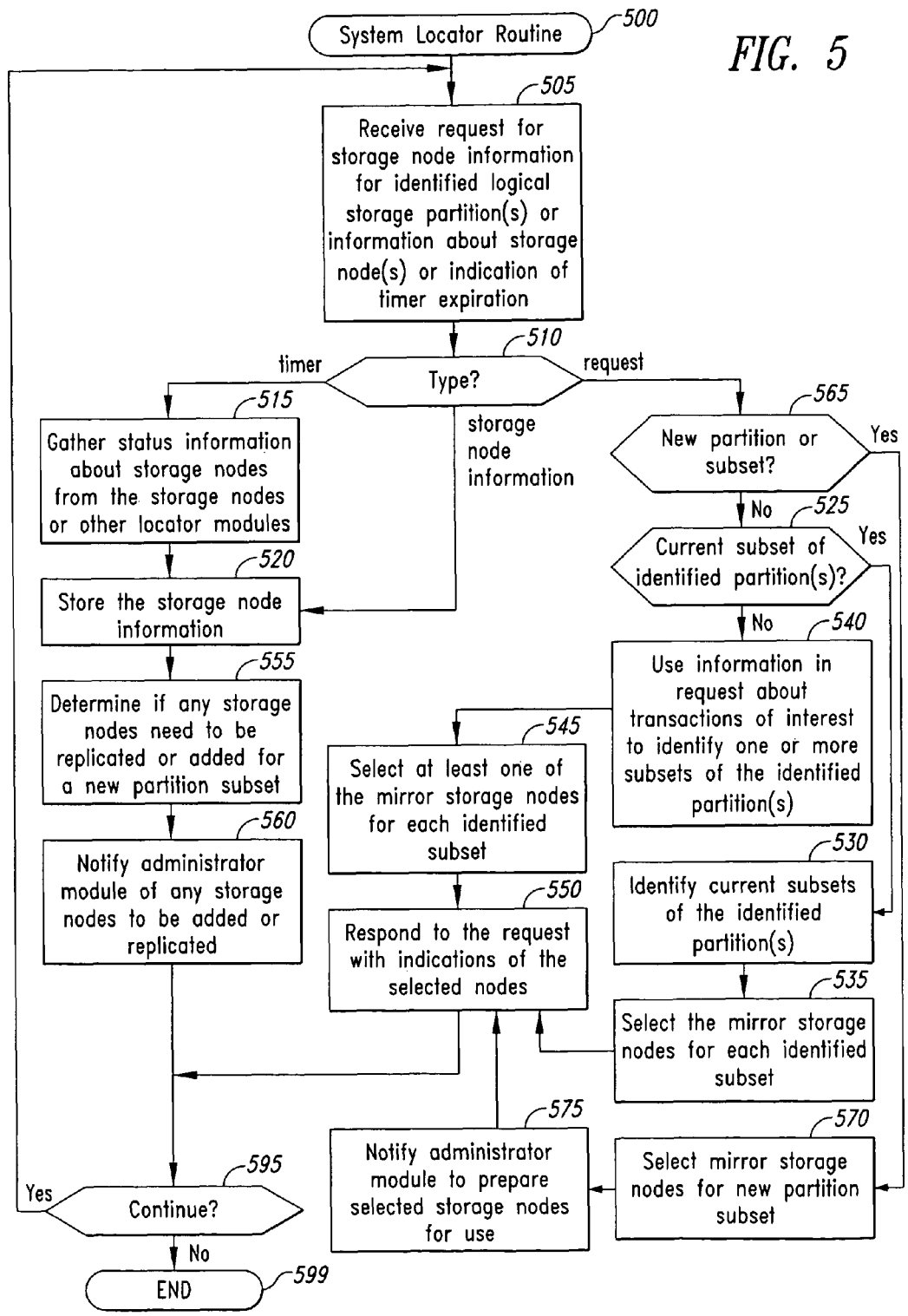
FIG. 5 is a flow diagram of an embodiment of a System Locator routine.

FIG. 5 is a flow diagram of an embodiment of a System Locator routine 500. Such a routine may be executed, for example, by a System Locator module 343 in the illustrated embodiment of FIG. 3 and/or by one of the locator nodes 126 of FIG. 1B, such that multiple copies of the routine may execute simultaneously in parallel (e.g., one on each locator node). The routine tracks information about storage nodes and logical storage partitions, and provides information about storage nodes for logical storage partitions as requested.

The routine begins at step 505, where the routine receives an indication of an event of interest occurring, such as information about current status of one or more storage nodes, a request for information about storage nodes associated with a logical storage partition (e.g., from a management node), or an indication that a timer has expired related to gathering status information about storage nodes. If it is determined in step 510 that the event of interest is that a timer has expired, the routine continues to step 515 to gather status information about at least some of the storage nodes of the TISS system (e.g., local storage nodes, or all storage nodes), such as by obtaining the information from those storage nodes and/or from one or more other locator modules. After status information about one or more storage nodes is obtained in step 515, or if it was instead determined in step 510 that the event of interest was the receipt of status information about one or more storage nodes (e.g., status information sent from one or more storage nodes, an indication of unavailability of a storage node from a management node, etc.), the routine continues to step 520 to store the status information for later use. The routine then continues to step 555 to determine based on the current storage node status information whether any storage nodes need to be replicated (e.g., based on one or repeated indications of unavailability) and/or whether any new storage nodes need to be added for a new partition subset (e.g., based on a current partition subset being substantially or completely full), and if so in step 560 notifies an administrator module of any such needs.

If it was instead determined in step 510 that the event of interest is a request for information related to one or more identified logical storage partitions, the routine continues to step 565 to determine for each of the identified partitions if the partition is a new partition that has not yet been established or if information is being requested for a new subset that has not yet been established of an existing partition. If so, the routine continues to step 570 to select a group of mirror storage nodes for each new partition subset, and in step 575 notifies an administrator module to prepare each of the mirror storage nodes to store the partition subset. If it is determined in step 565 that any of the identified partitions for the request are existing partitions with established subsets, the routine continues instead to step 525 to determine if the request is to identify the group of mirror storage nodes for the current subset of each of the identified partitions so that new transaction information may be stored, and if so continues to steps 530 and 535 to identify the current subsets and to select the mirror storage nodes for each identified subset.

If it is instead determined in step 525 that the request is not for the group of mirror storage nodes for the current subset of each of the identified partitions, the routine continues instead to step 545 to select at least one mirror storage node for each identified partition subset. If the request did not identify a specific partition subset, the routine may first use information from the request to identify the one or more subsets of the identified partition that are of interest, such as to identify subsets that store transactions in a specified range or that otherwise match specified criteria of interest. After steps 535, 545 or 575, the routine continues to step 550 to respond to the received request with indications of the selected nodes. After steps 550 or 560, the routine then continues to step 595 to determine whether to continue. If so, the routine returns to step 505, and if not the routine continues to step 599 and ends.

Figure 6:
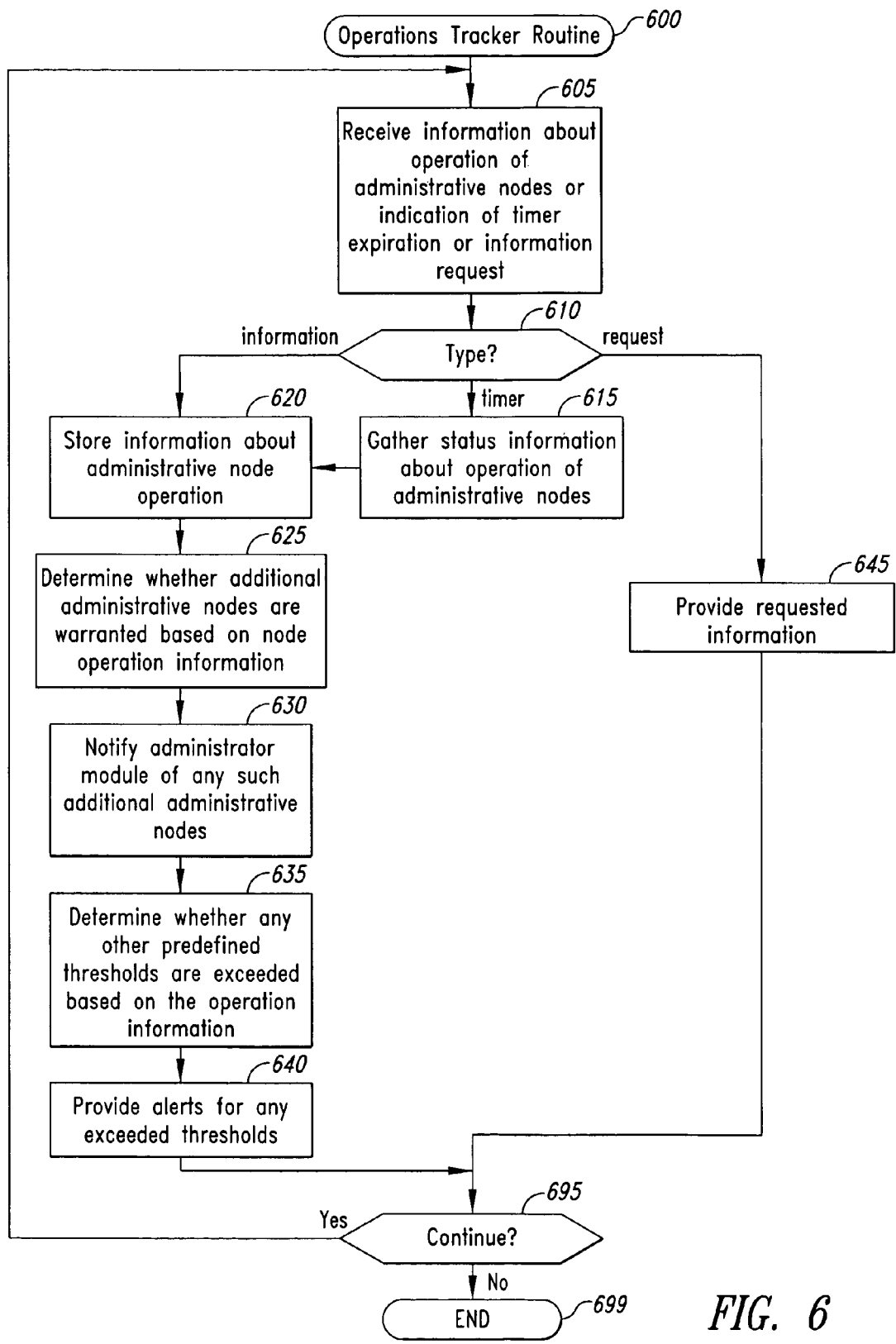
FIG. 6 is a flow diagram of an embodiment of an Operations Tracker routine.

FIG. 6 is a flow diagram of an embodiment of an Operations Tracker routine 600. Such a routine may be executed, for example, by an Operations Tracker module 347 in the illustrated embodiment of FIG. 3 and/or by one of the tracking nodes 125 of FIG. 1B, such that multiple copies of the routine may execute simultaneously in parallel (e.g., one on each tracking node). The routine tracks information about the operation of administrative nodes, and uses the information to cause new administrative nodes to be added or otherwise to provide information about current performance of the TISS system.

The routine begins at step 605, where the routine receives an indication of an event of interest occurring, such as information about current status of one or more administrative nodes, a request for information about administrative nodes (e.g., from a customer or administrative user who is monitoring operation of the TISS system), or an indication that a timer has expired related to gathering status information about administrative nodes. If it is determined in step 610 that the event of interest is that a timer has expired, the routine continues to step 615 to gather status information about at least some of the administrative nodes of the TISS system (e.g., local administrative nodes, or all administrative nodes), such as by obtaining the information from those administrative nodes and/or from one or more other tracking modules. After status information about one or more administrative nodes is obtained in step 615, or if it was instead determined in step 610 that the event of interest was the receipt of status information about one or more administrative nodes (e.g., status information sent from one or more administrative nodes, an indication of unavailability of an administrative node from another node, etc.), the routine continues to step 620 to store the status information for later use. The routine then continues to step 625 to determine based on the current administrative node status information whether any additional administrative nodes are warranted, such as to replace one or more unavailable administrative nodes (e.g., based on one or repeated indications of unavailability) and/or to add additional nodes to handle increasing demand (e.g., based on a computing load on a type of administrative node exceeding a predefined threshold), and if so in step 630 notifies an administrator module of any such additional administrative nodes to be added. In other embodiments, a tracking node may instead itself add at least some types of administrative nodes.

After step 630, the routine continues to step 635 to determine whether any other predefined thresholds have been exceeded based on the stored status information on the operation of the administrative nodes, such as thresholds defined by an administrative user and/or by a customer. If any such thresholds are exceeded, the routine provides alerts as appropriate in step 640, such as in a manner specified when the exceeded threshold was defined. If it is instead determined in step 610 that the event of interest is a request for information related to one or more administrative nodes or types of administrative nodes, the routine continues to step 645 to gather and provide the requested information as appropriate, such as if the requester is verified as being authorized to receive the requested information. While not illustrated here, in some embodiments the routine may further receive and handle other types of requests, such as to define thresholds and corresponding types of alerts (e.g., requests from customers). In some embodiments, the ability to define alert thresholds and/or receive alerts may be an optional functionality that is provided to customers, such as on a for-fee basis. After steps 640 or 645, the routine then continues to step 695 to determine whether to continue. If so, the routine returns to step 605, and if not the routine continues to step 699 and ends.

Figure 7:
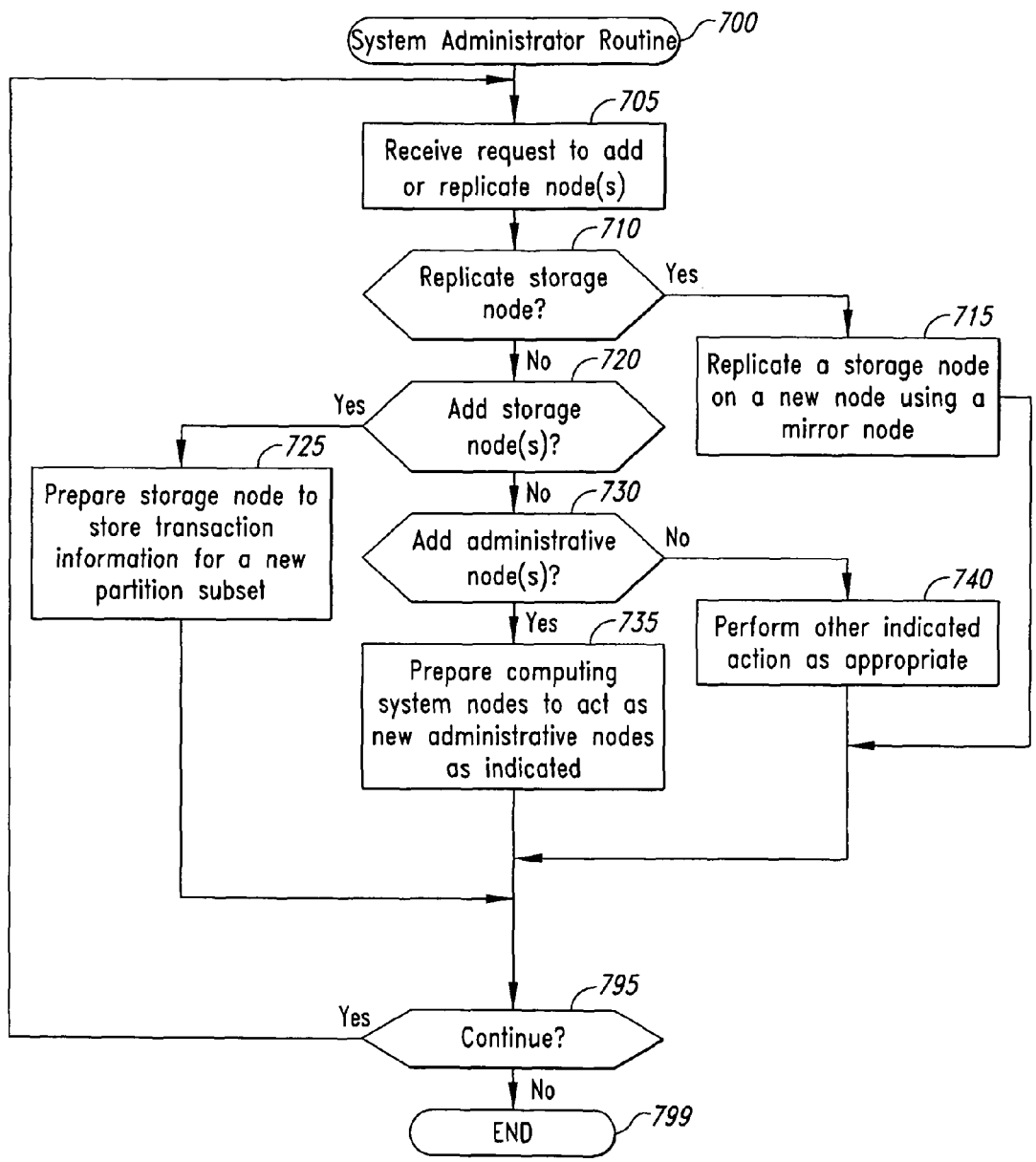
FIG. 7 is a flow diagram of an embodiment of a System Administrator routine.

FIG. 7 is a flow diagram of an embodiment of a System Administrator routine 700. Such a routine may be executed, for example, by a System Administrator module 345 in the illustrated embodiment of FIG. 3 and/or by one of the administrator nodes 127 of FIG. 1B, such that multiple copies of the routine may execute simultaneously in parallel (e.g., one on each administrator node). The routine receives requests to add nodes or otherwise perform administrative actions related to operation of the distributed computing and storage architecture, and responds to the requests as appropriate.

The routine begins at step 705, where a request is received, such as from a locator module or tracking module. The routine continues to step 710 to determine whether the request is to replicate an unavailable existing storage node, and if so continues to step 715 to use a mirror node (e.g., a local mirror node) for the unavailable storage node to replicate the unavailable storage node on a new node by copying the stored transaction information from the mirror storage node to the new node. In at least some embodiments, the replication may be performed on a new node that is local to the unavailable storage node (e.g., at the same data center), such as by using one of multiple new nodes that have been made available for use (e.g., dynamically added during operation of the TISS system) but that have not yet been allocated for use, or instead by changing how a node that is already in use by the TISS system is to be used.

If it is instead determined in step 710 that the request is not to replicate an unavailable existing storage node, the routine continues instead to step 720 to determine whether the request is to add one or more storage nodes for use with a new partition subset. If so, the routine continues to step 725 to prepare the storage node(s) for use in storing transaction information, such as by creating an appropriate database table on the node and/or by installing any needed software that is not yet present (e.g., database server software, a component of the TISS system to enable communication with other nodes, etc.). As with replicating a storage node, in at least some embodiments the storage nodes being added are one of multiple new nodes that have been made available for use but that have not yet been allocated.

If it is instead determined in step 720 that the request is not to add one or more storage nodes for use with a new partition subset, the routine continues instead to step 730 to determine whether the request is to add one or more administrative nodes. If so, the routine continues to step 735 to prepare one or more new computing nodes for use in acting as the administrative nodes being added, such as by installing any needed software that is not yet present (e.g., a copy of an appropriate module of the TISS system), by creating database tables on locator and tracking nodes to store various types of status information, and/or by initiating storage of any information to be used by the node. For example, a new locator node may gather status information about storage nodes from other locator nodes and/or from the storage nodes, a new tracking node may gather status information about administrative nodes from other tracking nodes and/or from the administrative nodes, and new administrator and management nodes may not need additional information to be stored (e.g., if they use status information from other nodes during their operation, such as from locator nodes and/or tracking nodes). As with replicating storage nodes, in at least some embodiments the computing nodes being added are one of multiple new nodes that have been made available for use but that have not yet been allocated.

If it is instead determined in step 730 that the request is not to add one or more administrative nodes, the routine continues instead to step 740 to perform another indicated action as appropriate (e.g., to modify or remove existing nodes or existing logical storage partitions, to perform activities related to maintaining or using customer information, etc.). After steps 715, 725, 735, or 740, the routine continues to step 799 to determine whether to continue. If so, the routine returns to step 705, and if not continues to step 799 and ends.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for storing information about transactions between users, the method comprising:

as implemented by one or more computing systems, providing a transaction information storage service for storing information about transactions between a plurality of users, the transaction information storage service having multiple computing devices available for storing multiple logical storage partitions for the transaction information storage service that are each specific to one of the plurality of users and include information about transactions involving that one user, the providing of the transaction information storage service including, receiving a first group of one or more usage requests and a second group of one or more other usage requests, the usage requests of the first group each requesting an operation that includes storing indicated information about one or more transactions between multiple users involving at least one transfer of funds between those multiple users, the usage requests of the second group each requesting an operation that includes retrieving stored information about at least one transactions between users involving a transfer of funds between those users, the usage requests of the first and second groups being received from one or more remote programs via invocation of at least one interface provided for the transaction information storage service;

for each of the received usage requests of the first group, responding by selecting one of the multiple logical storage partitions in which to store the indicated information for the usage request, the selected one logical storage partition for the usage request being specific to one of the multiple users involved in the at least one transfer of funds for the one or more transactions of the usage request;

identifying a group of multiple mirror computing devices that are associated with the selected logical storage partition; and attempting to store a copy of the indicated information for the usage request on each of the mirror computing devices of the identified group; and for each of the received usage requests of the second group, responding by identifying at least one of multiple computing devices on which the stored information for the usage request is stored and providing that stored information from one of the identified computing devices.

2. The method of claim 1 wherein at least one of the logical storage partitions selected for at least one of the received usage requests of the first group has multiple subsets that each include a distinct portion of the stored transaction information for the logical storage partition, each of the multiple subsets having a distinct associated group of multiple mirror computing devices that each store a copy of the portion of the stored transaction information for that subset.

3. The method of claim 2 wherein one of the multiple subsets for each of the at least one logical storage partitions is a current subset for that logical storage partition such that new transaction information to be stored in that logical storage partition is added to the current subset, and wherein the identifying of the group of multiple mirror computing devices that are associated with one of the at least one logical storage partitions includes selecting the multiple mirror computing devices associated with the current subset for that logical storage partition.

4. The method of claim 2 including, when a current group of multiple mirror computing devices associated with a logical storage partition becomes substantially full, creating a new subset for the logical storage partition and selecting a group of multiple mirror computing devices for the new subset.

5. The method of claim 2 wherein each of the logical storage partitions of the transaction information storage service has multiple subsets that each include a distinct portion of the stored transaction information for that logical storage partition.

6. The method of claim 1 wherein the attempting to store a copy of indicated information on each of the multiple mirror computing devices of an identified group includes, unless it is determined that all of the copies of the indicated information are successfully stored on the multiple mirror computing devices, providing an indication that the indicated information was not successfully stored by the transaction information storage service.

7. The method of claim 6 wherein, for each of the identified groups of multiple mirror computing devices, at least one of the mirror computing devices of the identified group is geographically remote from at least one other of the mirror computing devices of the identified group.

8. The method of claim 1 wherein the responding to each received usage request of the first group includes selecting multiple of the logical storage partitions in which to store the indicated information for the usage request based at least in part on the indicated information for the usage request, identifying a distinct group of multiple mirror computing devices for each of the selected multiple logical storage partitions, and attempting to store a copy of the indicated information on each of the mirror computing devices for each of the identified groups.

9. The method of claim 8 wherein, for one of the received usage requests, the one or more transactions for the one usage request include a first transaction involving a first user, the one logical storage partition that is selected for the one usage request is a first of the selected multiple logical storage partitions that is specific to the first user, and a second of the selected multiple logical storage partitions for the one usage request is selected based at least in part on an identifier for the first transaction that is not specific to the first user, the second logical storage partition being distinct from the first logical storage partition.

10. The method of claim 9 wherein the first transaction for the one usage request further involves a second user distinct from the first user, wherein a third of the selected multiple logical storage partitions for the one usage request is selected based on being specific to the second user, the third logical storage partition being distinct from the first and second logical storage partitions, and wherein the information stored in the third logical storage partition is information specific to the second user.

11. The method of claim 10 wherein the information specific to the second user that is stored in the third logical storage partition includes a user-specific identifier for the second user that is an indexing value for the stored information.

12. The method of claim 10 wherein a first portion of the indicated information for the first transaction that is stored in the selected first logical storage partition is distinct from a second portion of that indicated information for the first transaction that is stored in the selected third logical storage partition.

13. The method of claim 9 wherein the indicated information whose copy is stored on the mirror computing devices of the identified group for the first logical storage partition includes a subset of the indicated information for the one usage request that is specific to the first user.

14. The method of claim 1 wherein the responding to each received usage request of the second group includes selecting one of the multiple logical storage partitions of the transaction information storage service in which the information about the transaction for the usage request is stored, and wherein the identifying of the at least one computing device on which the stored information is stored includes selecting one of the multiple mirror computing devices that are associated with the selected logical storage partition.

15. The method of claim 1 including, for each of at least one of the logical storage partitions, automatically modifying the computing devices associated with the logical storage partition during use of the logical storage partition based on failure related to one or more of the computing devices associated with the logical storage partition before the modifying and/or based on one or more of the modified computing devices being a new computing device that became available after use of the logical storage partition began.

16. The method of claim 1 including, if one of the mirror computing devices associated with a logical storage partition becomes unavailable, automatically replicating that one mirror computing device on another computing device using another of the mirror computing devices associated with the logical storage partition.

17. The method of claim 1 including, if one of the mirror computing devices associated with a logical storage partition becomes substantially full, automatically adding one or more additional computing devices for use with that logical storage partition.

18. The method of claim 1 wherein the one or more computing systems are programmed to operate as administrative server computing systems for the transaction information storage service, and wherein the transaction information storage service further uses additional administrative computing devices to facilitate storage of transaction information.

19. The method of claim 18 wherein the additional administrative computing devices include at least one of one or more locator node computing devices that maintain information about which computing devices store information for transactions, one or more administrative node computing devices that add additional computing devices for use with logical storage partitions, one or more management node computing devices that manage storing of indicated information regarding transactions, and one or more tracking node computing devices that maintain status information about other administrative computing devices.

20. The method of claim 18 wherein the transaction information storage service is a distributed transaction information storage service, and wherein the method further comprises automatically scaling functionality provided by the distributed transaction information storage service by adding further additional administrative computing devices to maintain a degree of availability.

21. The method of claim 1 wherein the transaction information storage service further includes a queuing service to temporarily store received usage requests.

22. The method of claim 1 wherein the multiple mirror computing devices associated with each logical storage partition are selected so as to include computing devices at multiple distinct geographical locations.

23. The method of claim 1 including, for each of at least some of the usage requests each received from a remote program, notifying the remote program of performance of the requested operation for the usage request.

24. The method of claim 1 including receiving one or more other types of usage requests from one or more remote programs and responding to the received usage requests of the other types.

25. A computer-readable storage medium whose contents include instructions that when executed cause a computing device to provide a transaction information storage service that stores information about transactions between users, by performing a method comprising:
obtaining access to multiple devices that are each available for storing information about transactions as part of a transaction information storage service, the multiple devices storing multiple logical storage partitions that are each associated with a user and include information about transactions involving that associated user;
receiving a first usage request that requests an operation related to storing indicated information about one or more transactions involving multiple users, and receiving a second usage request that requests an operation related to retrieving stored information about one or more transactions, the first and second usage requests being received from one or more remote programs via invocation of at least one interface provided for the transaction information storage service;
responding to the first usage request by:
selecting one of the multiple logical storage partitions in which to store the indicated information, the selected one logical storage partition being associated with one of the multiple users involved in the one or more transactions of the first usage request;
identifying a group of at least two of the multiple devices that are mirror devices associated with the selected logical storage partition; and
attempting to store a copy of the indicated information on each of the mirror devices of the identified group; and
responding to the second usage request by identifying one or more of at least two of the multiple devices on which the stored information is stored and providing the stored information from at least one of the identified devices.

26. The computer-readable storage medium of claim 25 wherein the multiple devices are storage devices, and wherein at least one of the logical storage partitions has multiple subsets that each includes a distinct portion of the stored transaction information for the logical storage partition, each of the multiple subsets having a distinct associated group of multiple mirror devices that each store a copy of the portion of the stored transaction information for that subset.

27. The computer-readable storage medium of claim 26 wherein one of the multiple subsets for each of the at least one logical storage partitions is a current subset for that logical storage partition such that new transaction information to be stored in that logical storage partition is added to the current subset, and wherein the identifying of the group of devices associated with the selected logical storage partitions includes selecting the multiple mirror devices associated with the current subset for the selected logical storage partition.

28. The computer-readable storage medium of claim 25 wherein the attempting to store a copy of indicated information on each of the at least two mirror devices of the identified group includes, unless it is determined that all of the copies of the indicated information are successfully stored on the at least two mirror devices, providing an indication that the indicated information was not successfully stored by the transaction information storage service.

29. The computer-readable storage medium of claim 25 wherein the responding to the first usage request includes selecting multiple of the logical storage partitions in which to store the indicated information based at least in part on the indicated information, identifying a distinct group of multiple mirror devices for each selected logical storage partition, and attempting to store a copy of at least some of the indicated information on each of the mirror devices for each of the identified groups.

30. The computer-readable storage medium of claim 29 wherein one of the selected multiple logical storage partitions is selected based at least in part on an identifier for at least one of the one or more transactions for the first usage request, wherein another of the selected multiple logical storage partitions is selected based at least in part on information associated with another of the multiple users that is distinct from the one user, and wherein the information stored in the another logical storage partition is information specific to the another user.

31. The computer-readable storage medium of claim 25 wherein the method further comprises, for each of at least one of the logical storage partitions, automatically modifying the devices associated with the logical storage partition after use of the logical storage partition has commenced based on failure related to one or more of the devices associated with the logical storage partition and/or based on one or more of the modified devices being a new device that is newly available.

32. The computer-readable storage medium of claim 25 wherein the transaction information storage service further uses administrative computing devices to facilitate storage of transaction information, the administrative computing devices including at least one of one or more locator node computing devices that maintain information about which computing devices store information for transactions, one or more administrative node computing devices that add additional computing devices for use with logical storage partitions, one or more management node computing devices that manage storing of indicated information regarding transactions, and one or more tracking node computing devices that maintain status information about other administrative computing devices.

33. The computer-readable storage medium of claim 25 wherein the computer-readable medium is a memory of the computing device.

34. The computer-readable storage medium of claim 25 wherein the contents include one or more stored data structures for use by the transaction information storage service, the data structures comprising a multiplicity of entries, each entry corresponding to at least a portion of a logical storage partition and containing information related to multiple distinct data storage systems on which transaction information for that logical storage partition is stored.

35. A distributed system configured to provide a transaction information storage service that stores information about transactions, comprising:
  a plurality of devices that are each configured to store information about transactions as part of a transaction information storage service; and
  one or more administrative modules configured to receive multiple usage requests that each indicate a requested operation related to storing indicated information about one or more transactions, each of the usage requests received from a remote program via invocation of at least one interface provided for the transaction information storage service, and configured to respond to each of the received usage requests by:
    selecting one of multiple logical storage partitions of the transaction information storage service in which to store the indicated information for the usage request, the selecting being based at least in part on that indicated information and including selecting a logical storage partition that is associated with a user involved in the one or more transactions for the usage request;
    identifying a group of multiple of the plurality of devices that are mirror devices associated with the selected logical storage partition; and
    attempting to store a copy of the indicated information for the usage request on each of the mirror devices of the identified group.

36. The system of claim 35 wherein the plurality of devices are storage devices that are further configured to include the multiple logical storage partitions of the transaction information storage service, and wherein at least one of the logical storage partitions has multiple subsets that each includes a distinct portion of the stored transaction information for the logical storage partition, each of the multiple subsets having a distinct associated group of multiple mirror devices that each store a copy of the portion of the stored transaction information for that subset.

37. The system of claim 36 wherein one of the multiple subsets for each of the at least one logical storage partitions is a current subset for that logical storage partition such that new transaction information to be stored in that logical storage partition is added to the current subset, and wherein the identifying of the group of multiple mirror devices that are associated with one of the at least one logical storage partitions includes selecting the multiple mirror devices associated with the current subset for that logical storage partition.

38. The system of claim 35 wherein the attempting to store a copy of indicated information on each of the multiple mirror devices of an identified group includes, unless it is determined that all of the copies of the indicated information are successfully stored on the multiple mirror devices, providing an indication that the indicated information was not successfully stored by the transaction information storage service.

39. The system of claim 35 wherein one of the received multiple usage requests indicates a first requested operation related to storing first indicated information about a first transaction that involves at least a first user, wherein the user for whom the associated logical storage partition is selected for the one usage request is the first user, wherein the associated logical storage partition that is selected for the first user for the one usage request is a first logical storage partition, and wherein the responding to each received usage request includes selecting multiple of the logical storage partitions in which to store the indicated information for the usage request based at least in part on the indicated information, identifying a distinct group of multiple mirror devices for each selected logical storage partition, and attempting to store a copy of the indicated information on each of the mirror devices for each of the identified groups, the selected multiple logical storage partitions for the one usage request including the first selected logical storage partition associated with the first user involved in the first transaction for the one usage request and including one or more other second selected logical storage partitions that are not associated with the first user.

40. The system of claim 39 wherein one of the other second selected logical storage partitions for the one usage request is selected based at least in part on an identifier unique to the first transaction, and wherein the information stored in the first selected logical storage partition is information specific to the first user.

41. The system of claim 35 wherein the one or more administrative modules are further configured to receive multiple other usage requests that each indicate a requested operation related to retrieving stored information about a transaction, and to respond to each received other usage request by selecting one of the multiple logical storage partitions of the transaction information storage service in which the information about the transaction is stored, selecting one or more of multiple mirror devices that are associated with the selected one logical storage partition, and providing the stored information from at least one of the selected devices.

42. The system of claim 35 wherein the one or more administrative modules are further configured to, for each of at least one of the logical storage partitions, automatically modify the devices associated with the logical storage partition after use of the logical storage partition has commenced based on failure related to one or more of the devices associated with the logical storage partition and/or based on one or more of the modified devices being a new device that is newly available after the use commenced.

43. The system of claim 35 further comprising one or more administrative computing devices on which the one or more administrative modules execute and further comprising one or more additional administrative computing devices to facilitate storage of transaction information, the additional administrative computing devices including at least one of one or more locator node computing devices that maintain information about which computing devices store information for transactions, one or more administrative node computing devices that add additional computing devices for use with logical storage partitions, one or more management node computing devices that manage storing of indicated information regarding transactions, and one or more tracking node computing devices that maintain status information about other administrative computing devices.

44. The system of claim 43 wherein the one or more administrative modules each include software instructions for execution by one or more processors of the one or more administrative computing devices.

45. The system of claim 35 wherein the one or more administrative modules consist of one or more means for receiving multiple usage requests that each indicate a requested operation related to storing indicated information about one or more transactions, each of the usage requests received from a remote program via invocation of at least one interface provided for the transaction information storage service, and for responding to each of the received usage requests by:
- selecting one of multiple logical storage partitions of the transaction information storage service in which to store the indicated information for the usage request;
- identifying a group of multiple of the plurality of devices that are mirror devices associated with the selected logical storage partition; and
- attempting to store a copy of the indicated information for the usage request on each of the mirror devices of the identified group.

* * * * *